United States Patent
Boku et al.

(10) Patent No.: US 6,710,933 B2
(45) Date of Patent: Mar. 23, 2004

(54) ZOOM LENS AND VIDEO CAMERA COMPRISING THE SAME

(75) Inventors: Kazutake Boku, Kadoma (JP); Shuusuke Ono, Takatsuki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/297,018

(22) PCT Filed: May 29, 2001

(86) PCT No.: PCT/JP01/04513

§ 371 (c)(1),
(2), (4) Date: Nov. 27, 2002

(87) PCT Pub. No.: WO01/92941

PCT Pub. Date: Dec. 6, 2001

(65) Prior Publication Data

US 2003/0169510 A1 Sep. 11, 2003

(30) Foreign Application Priority Data

May 31, 2000 (JP) ............................. 2000-163214

(51) Int. Cl.$^7$ ......................................... G02B 15/14
(52) U.S. Cl. ............................... 359/687; 359/683
(58) Field of Search .................. 359/687, 683, 359/684, 676

(56) References Cited

U.S. PATENT DOCUMENTS

| | | | |
|---|---|---|---|
| 5,396,367 A | 3/1995 | Ono et al. | 359/687 |
| 5,424,869 A | 6/1995 | Nanjo | 359/687 |
| 5,532,763 A | 7/1996 | Janssen et al. | 348/744 |
| 5,546,231 A | 8/1996 | Sato | 359/687 |
| 5,548,347 A | 8/1996 | Melnik et al. | 348/761 |
| 5,604,525 A | 2/1997 | Kieselbach | 347/169 |
| 5,671,062 A | 9/1997 | Nakamura | 359/687 |
| 5,712,733 A | 1/1998 | Mukaiya | 359/687 |
| 5,781,251 A | 7/1998 | Otto | 348/744 |
| 5,940,221 A | 8/1999 | Okayama et al. | 359/687 |
| 6,101,043 A | 8/2000 | Kohno et al. | 359/687 |
| 6,344,932 B1 * | 2/2002 | Horiuchi | 359/687 |
| 6,433,938 B1 * | 8/2002 | Kawamura | 359/687 |
| 6,587,280 B2 * | 7/2003 | Horiuchi | 359/684 |

FOREIGN PATENT DOCUMENTS

EP   0 566 073   10/1993

(List continued on next page.)

*Primary Examiner*—Jordan M. Schwartz
(74) *Attorney, Agent, or Firm*—Merchant & Gould, P.C.

(57) ABSTRACT

A zoom lens includes: a first lens group including a negative lens, a positive lens, and a positive meniscus lens having a convex surface on an object side; a second lens group including a negative lens and a cemented lens composed of a double-concave lens and a positive lens; a third lens group including a positive lens and a negative plastic lens, and having at least one aspherical surface; a fourth lens group including a cemented lens composed of a negative plastic lens and a positive plastic lens, and having at least one aspherical surface. These lenses are arranged in the stated order from an object side. In this zoom lens, the following expression is satisfied:

$$5 < |(fp1+fp2+fp3)/fw| < 12$$

where fp1 represents a focal length of the negative plastic lens of the third lens group, fp2 and fp3 represent a focal length of the negative plastic lens and a focal length of the positive plastic lens of the fourth lens group, respectively, and fw represents a combined focal length of the entire system at a wide position.

31 Claims, 17 Drawing Sheets

FOREIGN PATENT DOCUMENTS

| | | |
|---|---|---|
| EP | 0 727 683 | 8/1996 |
| JP | 62-24213 | 2/1987 |
| JP | 3-200113 | 9/1991 |
| JP | 4-343313 | 11/1992 |
| JP | 5-60974 | 3/1993 |
| JP | 5-297275 | 11/1993 |
| JP | 5-323193 | 12/1993 |
| JP | 6-51200 | 2/1994 |
| JP | 8-106046 | 4/1996 |
| JP | 8-271787 | 10/1996 |
| JP | 9-21954 | 1/1997 |
| JP | 9-311272 | 12/1997 |
| JP | 11-305129 | 11/1999 |
| JP | 2000-305014 | 11/2000 |

* cited by examiner

ZOOM LENS AND VIDEO CAMERA COMPRISING THE SAME

TECHNICAL FIELD

The present invention relates to a zoom lens and a video camera using the same. More specifically, the present invention relates to a high-magnification spherical zoom lens that achieves a high magnification (zoom ratio: 23 times), high brightness (an F number of 1.6), low cost and a long back-focus, as well as to a video camera using the same.

BACKGROUND ART

Conventionally, to reduce the production cost of zoom lenses, plastic materials are used often as a lens material. Besides, in recent years, in the development of zoom lenses, in order to be competitive in the market, a zoom lens having a high resolution power while having a high varying power strongly has been demanded. In other words, it is necessary to provide a zoom lens with a high varying power and high resolution that can be produced at low cost.

A zoom lens that incorporates a plastic lens is disclosed in, for example, JP 8(1996)-106046 A, JP 9(1997)-311272 A. JP 8(1996)-106046 A discloses a zoom lens including ten lenses, four of which are plastic lenses, to provide a zoom ratio of 12 times. Furthermore, JP 9(1997)-311272 A discloses a zoom lens including ten lenses, five of which are plastic lenses, to provide a zoom ratio of 18 times.

However, in a zoom lens having a zoom ratio of 20 times or more, if a plastic lens is employed, the zoom lens incurs a great change in refractive indices of plastic materials due to a temperature change. Thus, since it is difficult to apply plastic lenses in a high-magnification zoom lens, most of lenses composing a zoom lens are glass lenses in the current state.

DISCLOSURE OF THE INVENTION

Therefore, with the foregoing in mind, it is an object of the present invention to provide a zoom lens that achieves high brightness at an F number of 1.6, a high magnification at a zoom ratio of 23 times, as well as high performance and low cost by applying an optimal power arrangement and an optimal arrangement of plastic lenses, and also to provide a video camera employing the foregoing zoom lens.

To achieve the foregoing object, a zoom lens according to a first aspect of the present invention includes: a first lens group having positive refracting power and being fixed with respect to the image plane; a second lens group having negative refracting power and varying power by moving along an optical axis; a third lens group having positive refracting power and being fixed with respect to the image plane; and a fourth lens group having positive refracting power and moving along the optical axis so that the image plane varied by a movement of the second lens group and a movement of an object is kept at a predetermined position from a reference plane. The first, second, third, and fourth lens groups are arranged in this order from an object side to an image plane side. In the zoom lens, the first lens group includes a negative lens, a positive lens, and a positive meniscus lens arranged from the object side in this order, in which the positive meniscus lens has a convex surface on the object side. The second lens group includes a negative lens, a double-concave lens, and a positive lens arranged from the object side in this order, and includes at least one aspherical surface, in which the double-concave lens and the positive lens are cemented with each other. The third lens group includes a positive lens and a negative plastic lens arranged from the object side in this order, and includes at least one aspherical surface. The fourth lens group includes a negative plastic lens and a positive plastic lens that are arranged from the object side in this order and cemented with each other, and includes at least one aspherical surface. In this zoom lens, the following expression (36) is satisfied:

$$5<|(fp1+fp2+fp3)/fw|<12 \tag{36}$$

where fp1 represents a focal length of the negative plastic lens of the third lens group, fp2 represents a focal length of the negative plastic lens of the fourth lens group, fp3 represents a focal length of the positive plastic lens of the fourth lens group, and fw represents a combined focal length of the entire system at a wide position.

With the above configuration of the zoom lens of the first aspect, it is possible to provide a zoom lens with a high magnification at a zoom ratio of 20 times or more, while balancing various aberrations thereof well. Besides, it is possible to cancel changes in respective refractive indices of plastic lens materials caused by temperature changes, thereby reducing deviations of the position of the image plane.

Furthermore, in the zoom lens according to the first aspect of the present invention, the following expression (37) preferably is satisfied:

$$7<|(fp1+fp2+fp3)/fw|<10.5 \tag{37}$$

Using this preferable example, it is possible to cancel changes in the respective refractive indices of the plastic lens materials caused by temperature changes, thereby substantially eliminating deviations of the position of the image plane. In this case, furthermore, the following expressions (38) to (41) preferably are satisfied:

$$9<f1/fw<11 \tag{38}$$

$$1<|f2/fw|<2 \tag{39}$$

$$4.5<f3/fw<6 \tag{40}$$

$$4.5<f4/fw<6.5 \tag{41}$$

where f1 represents a combined focal length of the first lens group, f2 represents a combined focal length of the second lens group, f3 represents a combined focal length of the third lens group, and f4 represents a combined focal length of the fourth lens group.

Using this preferable example, it is possible to make the zobm lens compact, while adjusting the various aberration performances excellently. In this. case, furthermore, the following expression (42) preferably is satisfied:

$$d12 \times fw<1.2 \tag{42}$$

where d12 represents a distance between the positive lens and the negative plastic lens of the third lens group.

Using this preferable example, a chromatic aberration can be corrected excellently in a zooming range from the wide position to a tele position.

Furthermore, in the zoom lens according to the first aspect of the present invention, the following expression (43) preferably is satisfied:

$$(\text{sag}(r1)+\text{sag}(r2)+d8)/d8<4.5 \tag{43}$$

where sag (r1) represents a sag amount between a center of an incident surface of the double-concave lens of the second lens group and a position where the incident surface of the double-concave lens is brought into contact with an outgoing surface of the negative lens disposed on the object side in the second lens group, sag (r2) represents a sag amount between a center and an outer-most peripheral portion of the outgoing surface of the double-concave lens, and d8 denotes a thickness of the double-concave lens.

Using this preferable example, the double-concave lens can be formed readily, whereby the yield thereof can be improved.

Furthermore, in the zoom lens according to the first aspect of the present invention, it is preferable that a radius of curvature of a lens surface closest to the image plane of the first lens group and a radius of curvature of a lens surface closest to the object of the second lens group are equal to each other. Using this preferable example, it is possible to prevent a distance between the surface closest to the image plane of the first lens group and the surface closest to the object of the second lens group from decreasing with increasing proximity to a lens periphery. This facilitates the production of a lens barrel.

Furthermore, in the zoom lens according to the first aspect of the present invention, the following expression (44) preferably is satisfied:

$$0.6 < BF/fw < 1.1 \tag{44}$$

where BF represents an air distance between an image-plane-side surface of the lens closest to the image plane and the image plane.

Using this preferable example, it is possible to ensure a back-focus necessary for allowing an infrared cut-off filter or a low-pass filter such as a crystal filter to be inserted. Besides, the back-focus is prevented from increasing unnecessarily, which makes it possible to provide a compact zoom lens.

Furthermore, a zoom lens according to a second aspect of the present invention includes: a first lens group having positive refracting power and being fixed with respect to the image plane; a second lens group having negative refracting power and varying power by moving along an optical axis; a third lens group having positive refracting power and being fixed with respect to the image plane; and a fourth lens group having positive refracting power and moving along the optical axis so that the image plane varied by a movement of the second lens group and a movement of an object is kept at a predetermined position from a reference plane. The first, second, third, and fourth lens groups are arranged in this order from an object side to an image plane side. In the zoom lens, the first lens group includes a negative lens, a positive lens, and a positive meniscus lens arranged from the object side in this order, in which the positive meniscus lens has a convex surface on the object side. The second lens group includes a negative lens, a double-concave lens, and a positive lens arranged from the object side in this order, and includes at least one aspherical surface, in which the double-concave lens and the positive lens are cemented with each other. The third lens group includes a positive lens and a negative plastic lens arranged from the object side in this order, and includes at least one aspherical surface. The fourth lens group includes a positive plastic lens and a negative plastic lens that are arranged from the object side in this order and cemented with each other, and includes at least one aspherical surface. In this zoom lens, the following expression (45) is satisfied:

$$5 < |(fp1+fp2+fp3)/fw| < 12 \tag{45}$$

where fp1 represents a focal length of the negative plastic lens of the third lens group, fp2 represents a focal length of the positive plastic lens of the fourth lens group, fp3 represents a focal length of the negative plastic lens of the fourth lens group, and fw represents a combined focal length of the entire system at a wide position.

With the above configuration of the zoom lens of the second aspect, it is possible to provide a zoom lens with a high magnification at a zoom ratio of 20 times or more, while balancing various aberrations thereof well. Besides, it is possible to cancel changes in respective refractive indices of plastic lens materials caused by temperature changes, thereby reducing deviations of the position of the image plane.

Furthermore, in the zoom lens according to the second aspect of the present invention, the following expression (46) preferably is satisfied:

$$7 < |(fp1+fp2+fp3)/fw| < 10.5 \tag{46}$$

Using this preferable example, it is possible to cancel changes in the respective refractive indices of the plastic lens materials caused by temperature changes, thereby substantially eliminating deviations of the position of the image plane. In this case, furthermore, the following expressions (47) to (50) preferably are satisfied:

$$9 < f1/fw < 11 \tag{47}$$

$$1 < |f2/fw1 < 2 \tag{48}$$

$$4.5 < f3/fw < 6 \tag{49}$$

$$4.5 < f4/fw < 6.5 \tag{50}$$

where f1 represents a combined focal length of the first lens group, f2 represents a combined focal length of the second lens group, f3 represents a combined focal length of the third lens group, and f4 represents a combined focal length of the fourth lens group.

Using this preferable example, it is possible to make the zoom lens compact, while adjusting the aberrations excellently. In this case, furthermore, the following expression (51) preferably is satisfied:

$$d12 \times fw < 1.2 \tag{51}$$

where d12 represents a distance between the positive lens and the negative plastic lens of the third lens group.

Using this preferable example, a chromatic aberration can be corrected excellently in a zooming range from the wide position to a tele position.

Furthermore, in the zoom lens according to the second aspect of the present invention, the following expression (52) preferably is satisfied:

$$(sag(r1)+sag(r2)+d8)/d8 < 4.5 \tag{52}$$

where sag (r1) represents a sag amount between a center of an incident surface of the double-concave lens of the second lens group and a position where the incident surface of the double-concave lens is brought into contact with an outgoing surface of the negative lens disposed on the object side in the second lens group, sag (r2) represents a sag amount between a center and an outer-most peripheral portion of the outgoing surface of the double-concave lens, and d8 denotes a thickness of the double-concave lens.

Using this preferable example, the double-concave lens can be formed readily, whereby the yield thereof can be improved.

Furthermore, in the zoom lens according to the second aspect of the present invention, it is preferable that a radius of curvature of a lens surface closest to the image plane of the first lens group and a radius of curvature of a lens surface closest to the object of the second lens group are equal to each other Using this preferable example, it is possible to prevent a distance between the surface closest to the image plane of the first lens group and the surface closest to the object of the second lens group from decreasing with increasing proximity to a lens periphery. This facilitates the production of a lens barrel.

Furthermore, in the zoom lens according to the second aspect of the present invention, the following expression (53) preferably is satisfied:

$$0.6 < BF/fw < 1.1 \tag{53}$$

where BF represents an air distance between an image-plane-side surface of the lens closest to the image plane and the image plane.

Using this preferable example, it is possible to ensure a back-focus necessary for allowing an infrared cut-off filter or a low-pass filter such as a crystal filter to be inserted. Besides, the back-focus is prevented from increasing unnecessarily, which makes it possible to provide a compact zoom lens.

Furthermore, a zoom lens according to a third aspect of the present invention includes: a first lens group having positive refracting power and being fixed with respect to the image plane; a second lens group having negative refracting power and varying power by moving along an optical axis; a third lens group having positive refracting power and being fixed with respect to the image plane; and a fourth lens group having positive refracting power and moving along the optical axis so that the image plane varied by a movement of the second lens group and a movement of an object is kept at a predetermined position from a reference plane. The first, second, third, and fourth lens groups are arranged in this order from an object side to an image plane side. In the zoom lens, the first lens group includes a negative lens, a positive lens, and a positive meniscus lens arranged from the object side in this order, in which the positive meniscus lens has a convex surface on the object side. The second lens group includes a negative lens, a double-concave lens, and a positive lens arranged from the object side in this order, and includes at least one aspherical surface, in which the double-concave lens and the positive lens are cemented with each other. The third lens group includes a positive lens and a negative plastic lens arranged from the object side in this order, and includes at least one aspherical surface. The fourth lens group includes a negative plastic lens and a positive plastic lens that are arranged from the object side in this order, and includes at least one aspherical surface. In this zoom lens, the following expression (54) is satisfied:

$$5 < |(fp1 + fp2 + fp3)/fw| < 12 \tag{54}$$

where fp1 represents a focal length of the negative plastic lens of the third lens group, fp2 represents a focal length of the negative plastic lens of the fourth lens group, fp3 represents a focal length of the positive plastic lens of the fourth lens group, and fw represents a combined focal length of the entire system at a wide position.

With the above configuration of the zoom lens of the third aspect, it is possible to provide a zoom lens with a high magnification at a zoom ratio of 20 times or more, while balancing various aberrations thereof well. Besides, it is possible to cancel changes in respective refractive indices of plastic lens materials caused by temperature changes, thereby reducing deviations of the position of the image plane.

Furthermore, in the zoom lens according to the third aspect of the present invention, the following expression (55) preferably is satisfied:

$$7 < |(fp1 + fp2 + fp3)/fw| < 10.5 \tag{55}$$

Using this preferable example, it is possible to cancel changes in the respective refractive indices of the plastic lens materials caused by temperature changes, thereby substantially eliminating deviations of the position of the image plane. In this case, furthermore, the following expressions (56) to (59) preferably are satisfied:

$$9 < f1/fw < 11 \tag{56}$$

$$1 < |f2/fw| < 2 \tag{57}$$

$$4.5 < f3/fw < 6 \tag{58}$$

$$4.5 < f4/fw < 6.5 \tag{59}$$

where f1 represents a combined focal length of the first lens group, f2 represents a combined focal length of the second lens group, f3 represents a combined focal length of the third lens group, and f4 represents a combined focal length of the fourth lens group.

Using this preferable example, it is possible to make the zoom lens compact, while adjusting the aberrations excellently. In this case, furthermore, the following expression (60) preferably is satisfied:

$$d12 \times fw < 12 \tag{60}$$

where d12 represents a distance between the positive lens and the negative plastic lens of the third lens group.

Using this preferable example, a chromatic aberration can be corrected excellently in a zooming range from the wide position to a tele position.

Furthermore, in the zoom lens according to the third aspect of the present invention, the following expression (61) preferably is satisfied:

$$(sag(r1) + sag(r2) + d8)/d8 < 4.5 \tag{61}$$

where sag (r1) represents a sag amount between a center of an incident surface of the double-concave lens of the second lens group and a position where the incident surface of the double-concave lens is brought into contact with an outgoing surface of the negative lens disposed on the object side in the second lens group, sag (r2) represents a sag amount between a center and an outer-most peripheral portion of the outgoing surface of the double-concave lens, and d8 denotes a thickness of the double-concave lens.

Using this preferable example, the double-concave lens can be formed readily, whereby the yield thereof can be improved.

Furthermore, in the zoom lens according to the third aspect of the present invention, it is preferable that a radius of curvature of a lens surface closest to the image plane of the first lens group and a radius of curvature of a lens surface closest to the object of the second lens group are equal to each other. Using this preferable example, it is possible to prevent a distance between the surface closest to the image plane of the first lens group and the surface closest to the object of the second lens group from decreasing with increasing proximity to a lens periphery. This facilitates the production of a lens barrel.

Furthermore, in the zoom lens according to the third aspect of the present invention, the following expression (62) preferably is satisfied:

$$0.6 < BF/fw < 1.1 \qquad (62)$$

where BF represents an air distance between an image-plane-side surface of the lens closest to the image plane and the image plane.

Using this preferable example, it is possible to ensure a back-focus necessary for allowing an infrared cut-off filter or a low-pass filter such as a crystal filter to be inserted. Besides, the back-focus is prevented from increasing unnecessarily, which makes it possible to provide a compact zoom lens.

Furthermore, a zoom lens according to a fourth aspect of the present invention includes: a first lens group having positive refracting power and being fixed with respect to the image plane; a second lens group having negative refracting power and varying power by moving along an optical axis; a third lens group having positive refracting power and being fixed with respect to the image plane; and a fourth lens group having positive refracting power and moving along the optical axis so that the image plane varied by a movement of the second lens group and a movement of an object is kept at a predetermined position from a reference plane. The first, second, third, and fourth lens groups are arranged in this order from an object side to an image plane side. In the zoom lens, the first lens group includes a negative lens, a positive lens, and a positive meniscus lens arranged from the object side in this order, in which the positive meniscus lens has a convex surface on the object side. The second lens group includes a negative lens, a double-concave lens, and a positive lens arranged from the object side in this order, and includes at least one aspherical surface, in which the double-concave lens and the positive lens are cemented with each other. The third lens group includes a positive lens and a negative plastic lens that are arranged from the object side in this order and cemented with each other, and includes at least one aspherical surface. The fourth lens group includes a negative plastic lens and a positive plastic lens that are arranged from the object side in this order and cemented with each other, and includes at least one aspherical surface. In this zoom lens, the following expression (63) is satisfied:

$$5 < |(fp1+fp2+fp3)/fw| < 12 \qquad (63)$$

where fp1 represents a focal length of the negative plastic lens of the third lens group, fp2 represents a focal length of the negative plastic lens of the fourth lens group, fp3 represents a focal length of the positive plastic lens of the fourth lens group, and fw represents a combined focal length of the entire system at a wide position.

With the above configuration of the zoom lens of the fourth aspect, it is possible to provide a zoom lens with a high magnification at a zoom ratio of 20 times or more, while balancing various aberrations thereof well. Besides, it is possible to cancel changes in respective refractive indices of plastic lens materials caused by temperature changes, thereby reducing deviations of the position of the image plane.

Furthermore, in the zoom lens according to the fourth aspect of the present invention, the following expression (64) preferably is satisfied:

$$7 < |(fp1+fp2+fp3)/fw| < 10.5 \qquad (64)$$

Using this preferable example, it is possible to cancel changes in the respective refractive indices of the plastic lens materials caused by temperature changes, thereby substantially eliminating deviations of the position of the image plane. In this case, furthermore, the following expressions (65) to (68) preferably are satisfied:

$$9 < f1/fw < 11 \qquad (65)$$

$$1 < |f2/fw| < 2 \qquad (66)$$

$$4.5 < f3/fw < 6 \qquad (67)$$

$$4.5 < f4/fw < 6.5 \qquad (68)$$

where f1 represents a combined focal length of the first lens group, f2 represents a combined focal length of the second lens group, f3 represents a combined focal length of the third lens group, and f4 represents a combined focal length of the fourth lens group.

Using this preferable example, it is possible to make the zoom lens compact, while adjusting the aberrations excellently.

Furthermore, in the zoom lens according to the fourth aspect of the present invention, the following expression (69) preferably is satisfied:

$$(\mathrm{sag}(r1)+\mathrm{sag}(r2)+d8)/d8 < 4.5 \qquad (69)$$

where sag (r1) represents a sag amount between a center of an incident surface of the double-concave lens of the second lens group and a position where the incident surface of the double-concave lens is brought into contact with an outgoing surface of the negative lens disposed on the object side in the second lens group, sag (r2) represents a sag amount between a center and an outer-most peripheral portion of the outgoing surface of the double-concave lens, and d8 denotes a thickness of the double-concave lens.

Using this preferable example, the double-concave lens can be formed readily, whereby the yield thereof can be improved.

Furthermore, in the zoom lens according to the fourth aspect of the present invention, it is preferable that a radius of curvature of a lens surface closest to the image plane of the first lens group and a radius of curvature of a lens surface closest to the object of the second lens group are equal to each other.

Using this preferable example, it is possible to prevent a distance between the surface closest to the image plane of the first lens group and the surface closest to the object of the second lens group from decreasing with increasing proximity to a lens periphery. This facilitates the production of a lens barrel.

Furthermore, in the zoom lens according to the fourth aspect of the present invention, the following expression (70) preferably is satisfied:

$$0.6 < BF/fw < 1.1 \qquad (70)$$

where BF represents an air distance between an image-plane-side surface of the lens closest to the image plane and the image plane.

Using this preferable example, it is possible to ensure a back-focus necessary for allowing an infrared cut-off filter or a low-pass filter such as a crystal filter to be inserted. Besides, the back-focus is prevented from increasing unnecessarily, which makes it possible to provide a compact zoom lens.

Furthermore, a video camera according to the present invention is configured so as to include the zoom lens according to the present invention. With this configuration for the video camera, it is possible to provide a video camera that is small in size, light in weight, and produced at low cost.

DESCRIPTION OF THE INVENTION

Hereinafter, the present invention will be described by way of illustrative embodiments with reference to the drawings.

[Embodiment 1]

Figure 1:
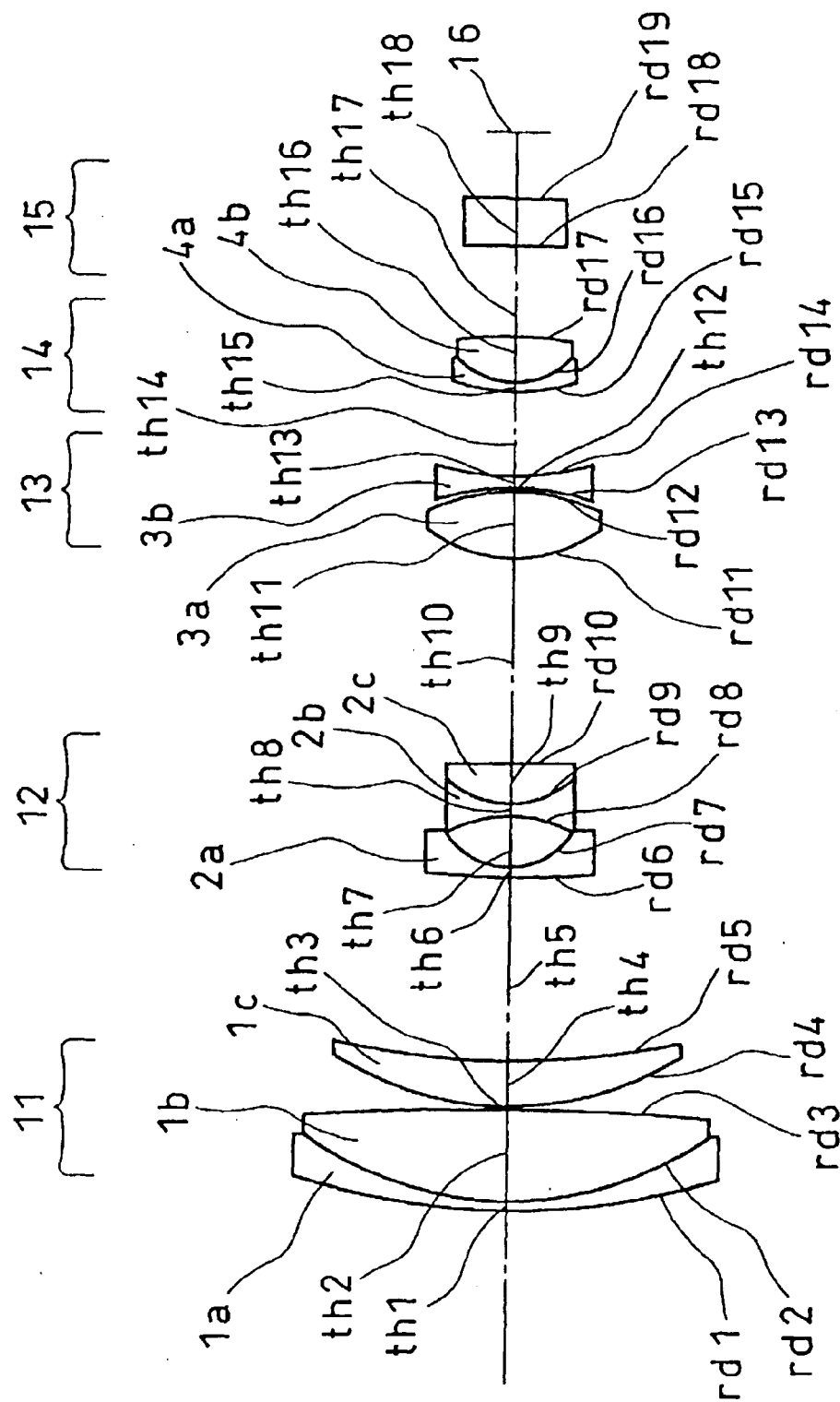
FIG. 1 is a view showing a configuration of a zoom lens according to Embodiment 1 of the present invention.

FIG. 1 is a view showing the arrangement of a zoom lens according to Embodiment 1 of the present invention.

As shown in FIG. 1, the zoom lens has a structure in which a first lens group 11, a second lens group 12, a third lens group 13, a fourth lens group 14, and a glass plate 15 are arranged from an. object side (left side in FIG. 1) to an image plane 16 side (right side in FIG. 1) in this order. Here, the glass plate 15 is equivalent optically to a crystal filter, a face plate of an imaging device, etc.

The first lens group 11 has positive refracting power, and is fixed with respect to the image plane 16 even when varying power and focusing. The second lens group 12 has negative refracting power and varies power by moving along an optical axis The third lens group 13 has positive refracting power, and is fixed with respect to the image plane 16 when varying power and focusing. The fourth lens group 14 has positive refracting power, and moves along the optical axis so that the image plane 16 varied by the movement of the second lens group 12 and the movement of the object to be imaged is kept at a predetermined position from a reference plane, thereby moving an image and adjusting the focus thereof at the same time in accordance with variable power.

The first lens group 11 is composed of a negative lens 1a, a positive lens 1b, and a positive meniscus lens 1c arranged from the object side in this order, in which the positive meniscus lens 1c has a convex surface on the object side. The second lens group 12 is composed of a negative lens 2a, and a cemented lens of a double-concave lens 2b and a positive lens 2c, which are arranged from the object side in this order, in which at least one of the surfaces of the foregoing lenses is aspherical. The third lens group 13 is composed of a positive lens 3a and a negative plastic lens 3b arranged from the object side in this order, in which at least one of the surfaces of these lenses is aspherical. The fourth lens group 14 is a cemented lens composed of a negative plastic lens 4a and a positive plastic lens 4b that are arranged from the object side in this order, in which at least one of the surfaces of these lenses is aspherical.

In the zoom lens according to the present embodiment, the following expression (71) is satisfied:

$$5<|(fp1+fp2+fp3)/fw|<12 \quad (71)$$

where fp1 represents a focal length of the negative plastic lens 3b of the third lens group 13, fp2 represents a focal length of the negative plastic lens 4a of the fourth lens group 14, fp3 represents a focal length of the positive plastic lens 4b of the fourth lens group 14, and fw represents a combined focal length of the entire system at a wide position.

With such a configuration that satisfies the expression (71), changes in refractive indices of the plastic lens materials caused by temperature changes can be canceled, whereby a deviation of the image plane position can be decreased. Generally, as properties of a plastic material, a refractive index thereof decreases as the temperature rises and increases as the temperature falls, and the plastic material swells as the temperature rises and shrinks as the temperature falls. In other words, if |(fp1+fp2+fp3)/fw| is not more than the lower limit of the expression (71), a negative-lens tendency increases in the combined focal length of the focal length fp1 of the negative plastic lens 3b of the third lens group 13, and the focal length fp2 of the negative plastic lens 4a and the focal length fp3 of the positive plastic lens 4b of the fourth lens group 14, and with a temperature rise, the image plane position is deviated farthest on the object side at the wide position. On the contrary, with a temperature fall, the image plane position is deviated significantly toward the image plane side at the wide position. This causes a phenomenon in which the fourth lens group 14 moving along the optical axis within a certain moving range so as to keep the image plane at a predetermined position from a reference surface is incapable of doing so as long as it moves within the foregoing moving range, thereby resulting in defocusing. On the other hand, if |(fp1+fp2+fp3)/fw| is not less than the upper limit of the expression (71), a positive-lens tendency increases in the combined focus length of the focus length fp1 of the-negative-plastic lens 3b of the third lens group 13 and the focus length fp2 of the negative plastic lens 4a and the focus length fp3 of the positive plastic lens 4b of the fourth lens group 14, and with a temperature rise, the image plane position is deviated farthest on the image plane side at the normal position. Therefore, this also results in defocusing.

Furthermore, in the zoom lens of the present embodiment, the following expression (72) is satisfied.

$$7<|(fp1+fp2+fp3)/fw|<10.5 \tag{72}$$

With such a configuration of the zoom lens that satisfies the expression (72) above, changes in refractive indices of the plastic lens materials caused by temperature changes are canceled, resulting in substantially no deviation of the image plane position occurring.

Furthermore, in the zoom lens according to the present embodiment, the following expressions (73) to (76) desirably are satisfied:

$$9<f1/fw<11 \tag{73}$$

$$1<|f2/fw|<2 \tag{74}$$

$$4.5<f3/fw<6 \tag{75}$$

$$4.5<f4/fw<6.5 \tag{76}$$

where f1 represents a combined focal length of the first lens group 11, f2 represents a combined focal length of the second lens group 12, f3 represents a combined focal length of the third lens group 13, and f4 represents a combined focal length of the fourth lens group 14.

In the case where the expressions (73) to (76) are satisfied, the zoom lens is configured to be compact, with aberration performances excellently adjusted.

If f1/fw is not more than the lower limit of the expression (73), the first lens group 11 has an excessive refracting power, which makes it difficult to correct a spherical aberration at the side of the long focal length and an off-axis coma-aberration. Besides, if f1/fw is not less than the upper limit of the expression (73), the length of the entire lens increases, which makes it difficult to make the zoom lens compact.

If |f2/fw| is not more than the lower limit of the expression (74), a Petzval sum of the entire system increases, so that a field curvature cannot be corrected. If |f2/fw| is not less than the upper limit of the expression (74), the Petzval sum decreases, but the length of the entire system increases, which makes it difficult to make the zoom lens compact.

If f3/fw is not more than the lower limit of the expression (75), the refracting power of the third lens group 13 increases, which makes it impossible to secure a back-focus that allows a crystal filter or the like to be inserted therein, and makes it difficult to correct the spherical aberration. Furthermore, if f3/fw is not less than the. upper limit of the expression (75), a Petzval sum increases, thereby making it difficult to correct a field curvature.

If f4/fw is not more than the lower limit of the expression (76), the size of the entire lens system increases, which makes it difficult to make the zoom lens compact. Furthermore, if f4/fw is not less than the upper limit of the expression (76), it is difficult to correct off-axis aberrations both in near photographing and in long-distance photographing at the same time.

Furthermore, in the zoom lens according to the present embodiment, the following expression (77) desirably is satisfied:

$$d12 \times fw<1.2. \tag{77}$$

where d12 represents a distance between the positive lens 3a and the negative plastic lens 3b of the third lens group 13.

In the case where the expression (77) is satisfied, a chromatic aberration can be corrected excellently in a zooming range from the wide position to the tele position. If d12×fw is not less than the upper limit of the expression (77), the chromatic aberration varies more significantly from the wide position to the tele position, thereby significantly deteriorating the performance.

In the zoom lens according to the present embodiment, the following expression (78) desirably is satisfied:

$$(sag(r1)+sag(r2)+d8)/d8<4.5 \tag{78}$$

where sag (r1) represents a sag amount between the center of an incident surface of the double-concave lens 2b of the second lens group 12 and a position where the incident surface of the double-concave lens 2b is brought into contact with an outgoing surface of the negative lens 2a disposed on the object side in the second lens group 12, sag (r2) represents a sag amount between the center and an outer-most peripheral portion of the outgoing surface of the double-concave lens 2b, and d8 denotes a thickness of the double-concave lens 2b.

With satisfaction of the expression (78), the double-concave lens 2b can be formed readily, whereby the yield thereof can be improved. If (sag(r1)+sag(r2)+d8)/d8 is not less than the upper limit of the expression (78), the ratio of a thickness of the central portion of the lens to an edge thickness of the peripheral portion of the lens increases, making it difficult to mold a lens. As a result, the yield is lowered and a low cost of lenses cannot be realized.

Furthermore, desirably the zoom lens according to the present embodiment is configured so that a lens surface closest to the image plane of the first lens group 11 has a radius of curvature equal to a radius of curvature of a lens surface closest to the object of the second lens group 12. This prevents the distance between the surface closest to the image plane of the first lens group 11 and the surface closest to the object of the second lens group 12 from decreasing with increasing proximity to a lens periphery. This facilitates the production of a lens barrel.

Furthermore, in the zoom lens according to the present embodiment, the following expression (79) desirably is satisfied:

$$0.6<BF/fw<1.1 \tag{79}$$

where BF represents an air distance between an image-plane-side surface or the lens closest to the image plane and the image plane.

By satisfying the foregoing expression (79), it is possible to ensure a back-focus necessary for allowing an infrared cut-off filter or a low-pass filter such as a crystal filter to be inserted. Besides, the back-focus is prevented from increasing unnecessarily, which makes it possible to provide a compact zoom lens If BF/fw is not more than the lower limit of the expression (79), a distance sufficient for allowing an infrared cut-off filter or a low-pass filter such as a crystal filter to be inserted cannot be ensured. On the other hand, if BF/fw is not less than the upper limit of the expression (79), the back-focus excessively increases, thereby making it impossible to provide a compact zoom lens.

EXAMPLE 1

The following Table 1 shows a specific example of the zoom lens according to the present embodiment.

TABLE 1

| Group | Surface | rd | th | nd | ν |
|---|---|---|---|---|---|
| 1 | 1 | 37.31 | 0.80 | 1.80518 | 25.4 |
|   | 2 | 20.08 | 5.05 | 1.58913 | 61.2 |
|   | 3 | −277.05 | 0.15 |   |   |
|   | 4 | 18.82 | 2.75 | 1.60311 | 60.7 |
|   | 5 | 51.75 | variable |   |   |
| 2 | 6 | 51.75 | 0.60 | 1.80500 | 39.6 |
|   | 7 | 4.37 | 2.71 |   |   |
|   | 8* | −8.59 | 0.80 | 1.60602 | 57.8 |
|   | 9 | 5.51 | 2.20 | 1.80518 | 25.5 |
|   | 10 | 71.99 | variable |   |   |
| 3 | 11* | 8.42 | 3.70 | 1.60602 | 57.8 |
|   | 12* | −10.17 | 0.20 |   |   |
|   | 13 | −15.57 | 0.60 | 1.58387 | 30.1 |
|   | 14 | 15.57 | variable |   |   |
| 4 | 15* | 9.60 | 0.60 | 1.58387 | 30.1 |
|   | 16 | 4.64 | 2.70 | 1.49178 | 57.2 |
|   | 17* | −18.52 | variable |   |   |
| 5 | 18 | ∞ | 2.80 | 1.51633 | 64.1 |
|   | 19 | ∞ | — |   |   |

In Table 1, rd represents a radius of curvature (mm) of a lens, th represents a thickness (mm) of a lens or an air distance (mm) between lenses, nd represents a refractive index of each lens with respect to a d-line, and ν represents an abbe number of each lens with respect to the d-line. The shape of an aspherical surface (in Table 1, such a surface is denoted with a mark * attached beside its reference number) is defined by the following equation (80).

$$Z = \frac{cy^2}{1 + \sqrt{1 - (1+k)c^2 y^2}} + Dy^4 + Ey^6 + Fy^8 + Gy^{10} \quad (80)$$

where y represents a height from the optical axis, Z represents a distance between a point on the aspherical surface at the height y from the optical axis and a tangent plane of the apex on the aspherical surface, c represents a curvature at the apex on the aspherical surface, k represents a conical constant, and D, E, F, and G represent aspherical coefficients.

The following Table 2 shows aspherical coefficients of the zoom lens in the present example.

TABLE 2

| Surface | k | D | E | F | G |
|---|---|---|---|---|---|
| 8 | −11.79950 | −2.20951 × 10⁻³ | 1.33194 × 10⁻⁴ | −1.25908 × 10⁻⁵ | 5.36379 × 10⁻⁷ |
| 11 | 0.66449 | −3.12933 × 10⁻⁴ | −2.19407 × 10⁻⁶ | 2.99348 × 10⁻⁷ | −5.45227 × 10⁻⁹ |
| 12 | 0.68418 | 4.94313 × 10⁻⁴ | 2.82004 × 10⁻⁶ | 4.37043 × 10⁻⁷ | −8.94886 × 10⁻⁹ |
| 15 | −0.87201 | 4.78208 × 10⁻⁵ | −8.02361 × 10⁻⁶ | 2.23438 × 10⁻⁶ | −1.34988 × 10⁻⁷ |
| 17 | −66.19940 | −1.16522 × 10⁻³ | 6.85576 × 10⁻⁵ | −9.23566 × 10⁻⁷ | −1.35439 × 10⁻⁷ |

The following Table 3 shows an air distance (mm) that is varied by zooming in the case where an object is positioned at infinity.

TABLE 3

|   | Wide position | Normal position | Tele position |
|---|---|---|---|
| Focal length | 3.010 | 27.036 | 69.075 |
| F No. | 1.688 | 2.551 | 3.378 |
| Angle of view (2ω) | 65.136 | 7.614 | 2.954 |
| th5 | 0.700 | 16.949 | 20.341 |
| th10 | 21.740 | 5.491 | 2.099 |
| th12 | 8.120 | 2.490 | 8.120 |
| th17 | 2.000 | 7.630 | 2.000 |

The normal position in Table 3 is where the third lens group 13 is placed most closely to the fourth lens group 14 In Table 3, Focal length (mm), F No., and ω(°) represent a focal length, an F number, and an incident angle of view at a wide position, a normal position, and a tele position of the zoom lens of the present example.

Figure 2:
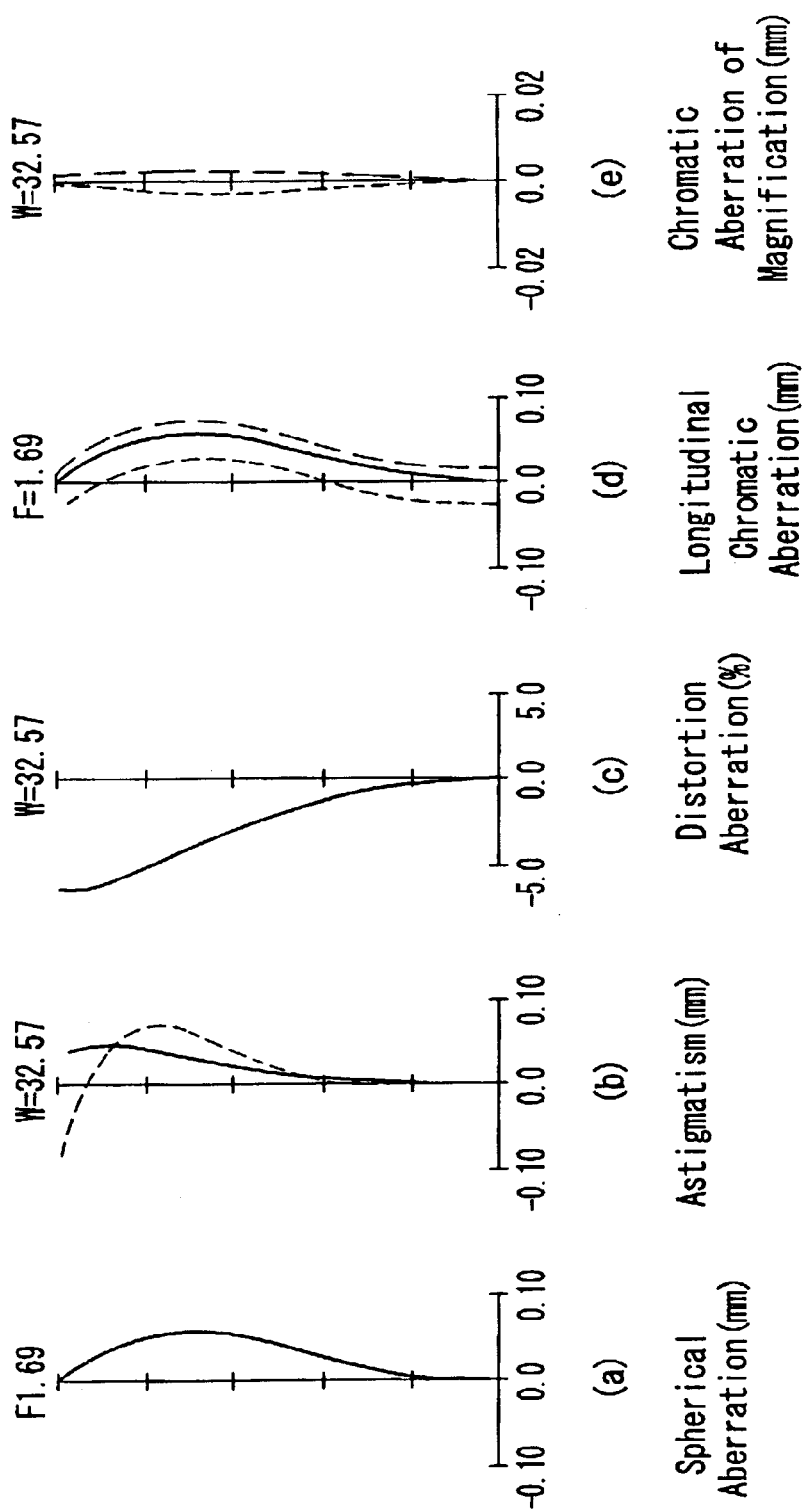
FIGS. 2A to 2E are views showing various aberrations at a wide position of the zoom lens according to Embodiment 1 of the present invention.
Figure 3:
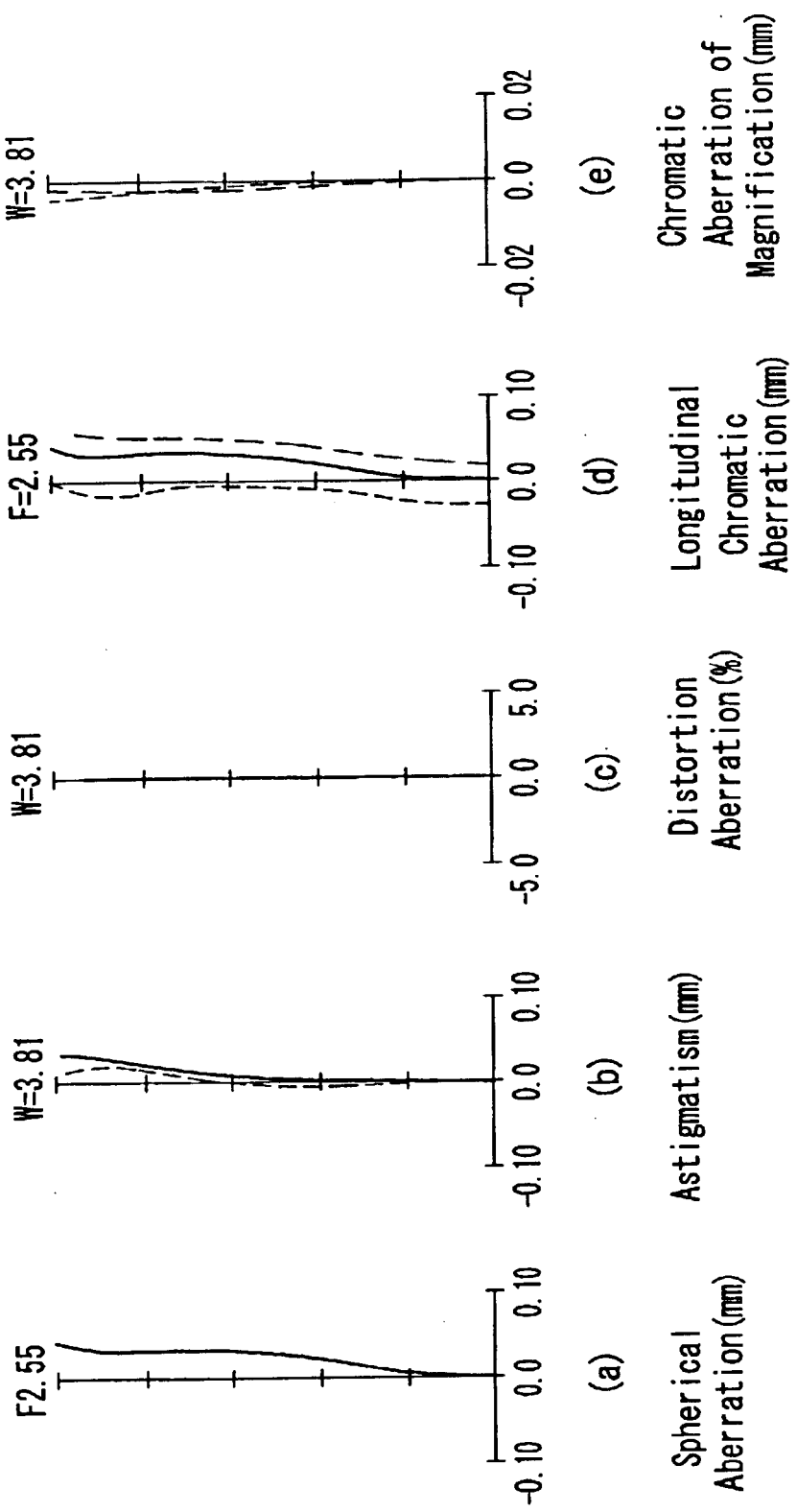
FIGS. 3A to 3E are views showing various aberrations at a normal position of the zoom lens according to Embodiment 1 of the present invention.
Figure 4:
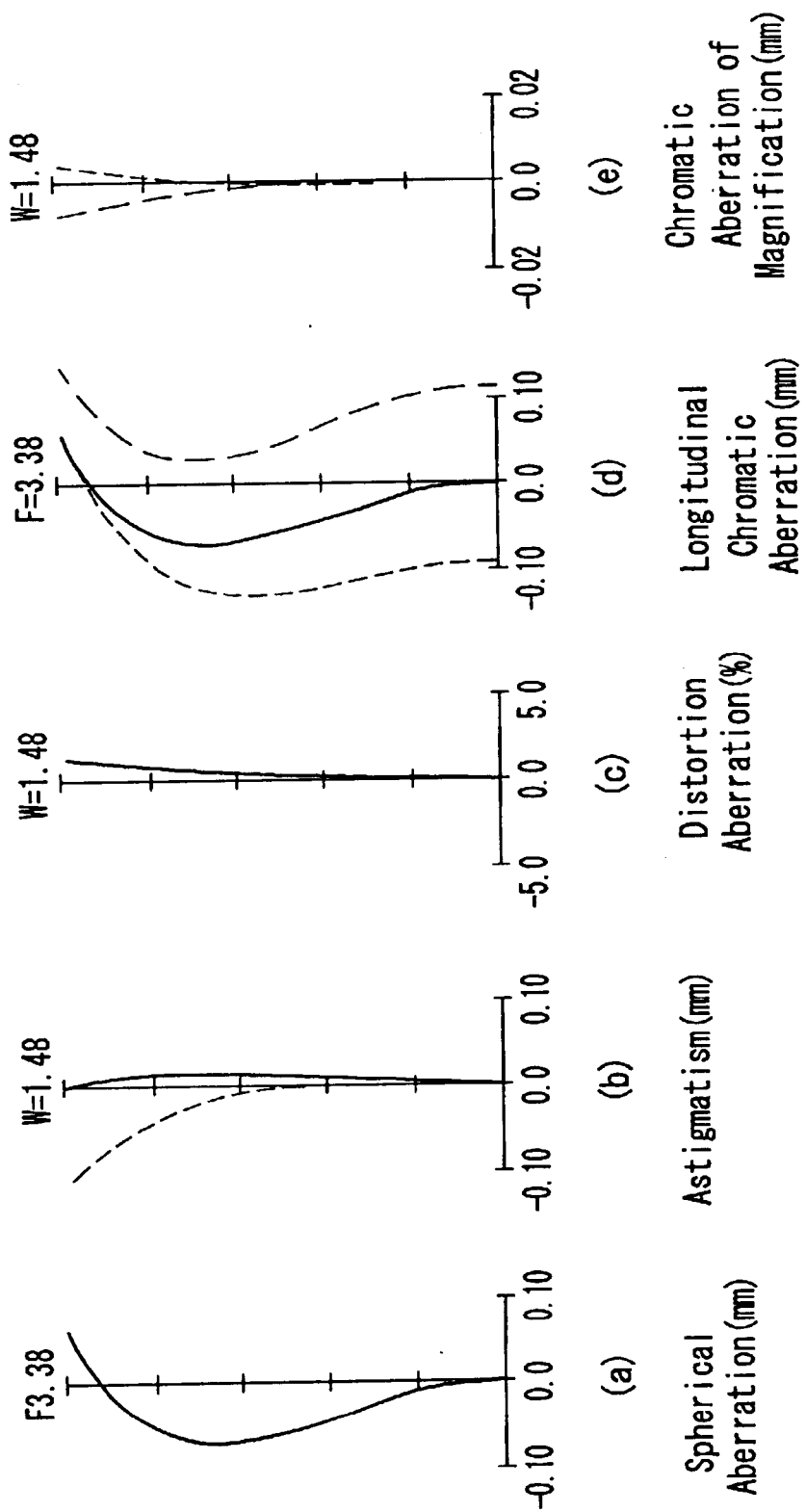
FIGS. 4A to 4E are views showing various aberrations at a tele position of the zoom lens according to Embodiment 1 of the present invention.

FIGS. 2A to 2E, 3A to 3E, and 4A to 4E show performances regarding various aberrations at the wide position, the normal position, and the tele position of the zoom lens shown in the present example, respectively. FIGS. 2A, 3A and 4A show a spherical aberration (mm); FIGS. 2B, 3B and 4B show astigmatism (mm); FIGS. 2C, 3C and 4C show a distortion aberration (%); FIGS. 2D, 3D and 4D show a longitudinal chromatic aberration (mm); and FIGS. 2E, 3E and 4E show a chromatic aberration of magnification (mm). In FIGS. 2B, 3B and 4B showing astigmatism, a solid line represents a sagittal feld curvature, and a broken line represents a meridional field curvature. In FIGS. 2D, 3D and 4D showing the longitudinal chromatic aberration and FIGS. 2E, 3E and 4E showing the chromatic aberration of magnification, a solid line represents the values with respect to the d-line, a short broken line represents the values with respect to an F-line, and a long broken line represents the values with respect to a C-line. As is apparent from the drawings regarding these aberrations, the zoom lens of the present example has an excellent aberration performance.

The amount of movement of the image plane position according to a change in a refractive index of a plastic lens material caused by a temperature change is 0.9 μm/C.° when the object is positioned at infinity and the zooming position is at the wide position.

[Embodiment 2]

Figure 5:
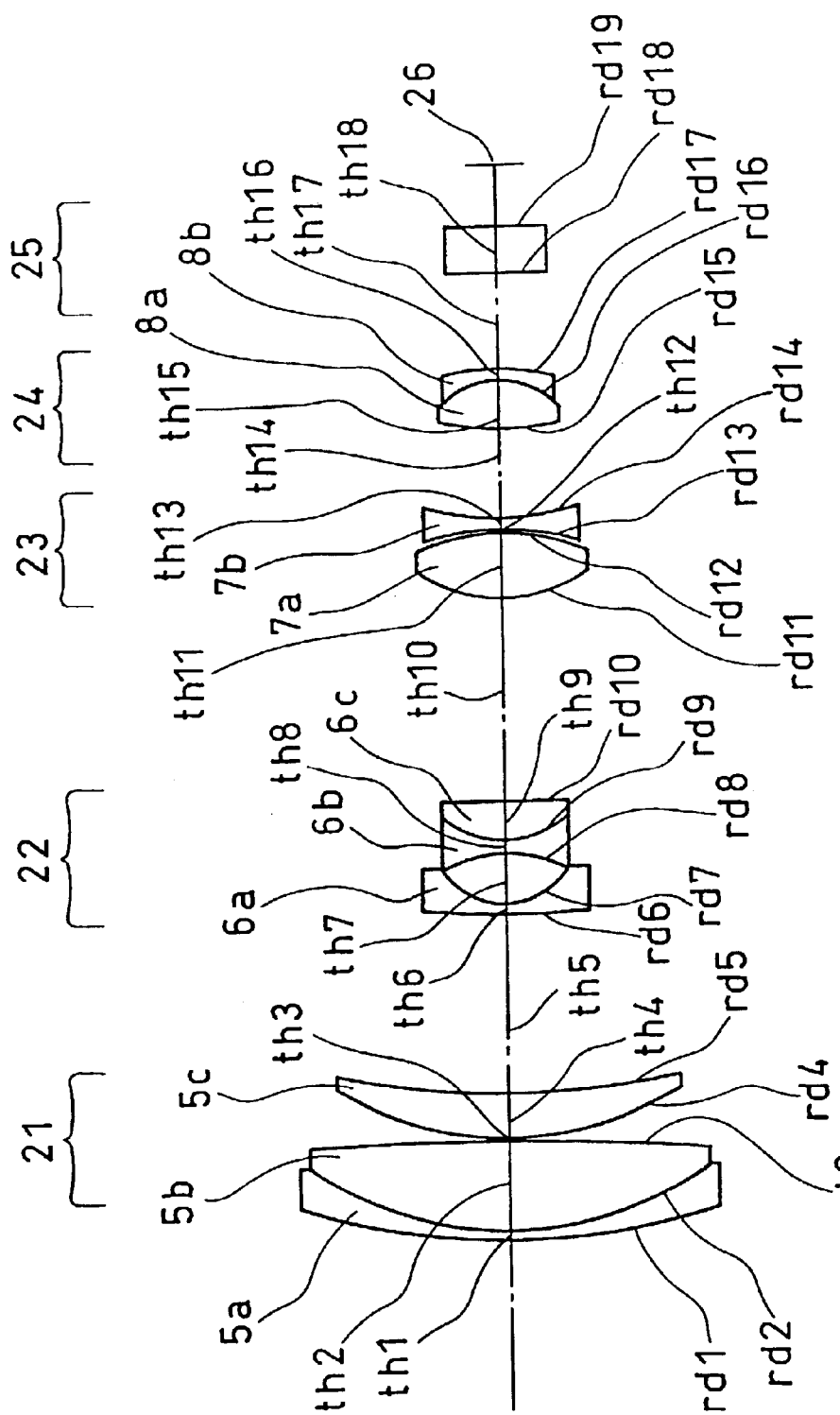
FIG. 5 is a view showing a configuration of a zoom lens according to Embodiment 2 of the present invention.

FIG. 5 is a view showing the arrangement of a zoom lens according to Embodiment 2 of the present invention.

As shown in FIG. 5, the zoom lens has a structure in which a first lens group 21, a second lens group 22, a third lens group 23, a fourth lens group 24, and a glass plate 25 are arranged from an object side (left side in FIG. 5) to an image plane 26 side (right side in FIG. 5) in this order. Here, the glass plate 25 is equivalent optically to a crystal filter, a face plate of an imaging device, etc.

The first lens group 21 has positive refracting power, and is fixed with respect to the image plane 26 even when varying power and focusing. The second lens group 22 has negative refracting power and varies power by moving along an optical axis. The third lens group 23 has positive refracting power, and is fixed with respect to the image plane 26 even when varying power and focusing. The fourth lens group 24 has positive refracting power, and moves along the optical axis so that the image plane 26 varied by the movement of the second lens group 22 and the movement of the object to be imaged is kept at a predetermined position from a reference plane, thereby moving an image and adjusting the focus thereof at the same time in accordance with variable power.

The first lens group 21 is composed of a negative lens 5a, a positive lens 5b, and a positive meniscus lens 5c arranged from the object side. in this order, in which the positive meniscus lens 5c has a convex surface on the object side. The second lens group 22 is composed of a negative lens 6a, and a cemented lens of a double-concave lens 6b and a positive lens 6c, which are arranged from the object side in this order, in which at least one of the surfaces of the foregoing lenses is aspherical. The third lens group 23 is composed of a positive lens 7a and a negative plastic lens 7b arranged from the object side in this order, in which at least one of the surfaces of these lenses is aspherical. The fourth lens group 24 is a cemented lens composed of a positive plastic lens 8a and a negative plastic lens 8b that are arranged from the object side in this order, in which at least one of the surfaces of these lenses is aspherical.

In the zoom lens according to the present embodiment, the following expression (81) is satisfied:

$$5 < |(fp1+fp2+fp3)/fw| < 12 \tag{81}$$

where fp1 represents a focal length of the negative plastic lens 7b of the third lens group 23, fp2 represents a focal length of the positive plastic lens 8a of the fourth lens group 24, fp3 represents a focal length of the negative plastic lens 8b of the fourth lens group 24, and fw represents a combined focal length of the entire system at a wide position.

With such a configuration that satisfies the expression (81), changes in refractive indices of the plastic lens materials caused by temperature changes can be canceled, whereby a deviation of the image plane position can be decreased. Generally, as properties of a plastic material, a refractive index thereof decreases as the temperature rises and increases as the temperature falls, and the plastic material swells as the temperature rises and shrinks as the temperature falls. In other words, if |(fp1+fp2+fp3)/fw| is not more than the lower limit of the expression (81), a negative-lens tendency increases in the combined focal length of the focal length fp1 of the negative plastic lens 7b of the third lens group 23, and the focal length fp2 of the positive plastic lens 8a and the focal length fp3 of the negative plastic lens 8b of the fourth lens group 24, and with a temperature rise, the image plane position is deviated farthest on the object side at the wide position. On the contrary, with a temperature fall, the image plane position is deviated significantly toward the image plane side at the wide position. This causes a phenomenon in which the fourth lens group 24 moving along the optical axis within a certain moving range so as to keep the image plane at a predetermined position from a reference surface is incapable of doing so as long as it moves within the foregoing moving range, thereby resulting in defocusing. On the other hand, if |(fp1+fp2+fp3)/fw| is not less than the upper limit of the expression (81), a positive-lens tendency increases in the combined focus length of the focus length fp1 of the negative plastic lens 7b of the third lens group 23 and the focus length fp2 of the positive plastic lens 8a and the focus length fp3 of the negative plastic lens 8b of the fourth lens group 24, and with a temperature rise, the image plane position is deviated farthest on the image plane side at the normal position. Therefore, this also results in defocusing.

Furthermore, in the zoom lens of the present embodiment, the following expression (82) is satisfied.

$$7 < |(fp1+fp2+fp3)/fw| < 10.5 \tag{82}$$

With such a configuration of the zoom lens that satisfies the expression (82) above, changes in refractive indices of the plastic lens materials caused by temperature changes are canceled, resulting in substantially no deviation of the image plane position occurring.

Furthermore, in the zoom lens according to the present embodiment, the following expressions (83) to (86) desirably are satisfied:

$$9 < f1/fw < 11 \tag{83}$$

$$1 < |f2/fw| < 2 \tag{84}$$

$$4.5 < f3/fw < 6 \tag{85}$$

$$4.5 < f4/fw < 6.5 \tag{86}$$

where f1 represents a combined focal length of the first lens group 21, f2 represents a combined focal length of the second lens group 22, f3 represents a combined focal length of the third lens group 23, and f4 represents a combined focal length of the fourth lens group 24.

In the case where the expressions (83) to (86) are satisfied, the zoom lens is configured to be compact, with aberration performances excellently adjusted.

If f1/fw is not more than the lower limit of the expression (83), the first lens group 21 has an excessive refracting power, which makes it difficult to correct a spherical aberration at the side of the long focal length and an off-axis coma-aberration. Besides, if f1/fw is not less than the upper limit of the expression (83), the full length of the lens increases, which makes it difficult to make the zoom lens compact.

If |f2/fw| is not more than the lower limit of the expression (84), a Petzval sum of the entire system increases, so that a field curvature cannot be corrected. If |f2/fw| is not less than the upper limit of the expression (84), the Petzval sum decreases, but the length of the entire system increases, which makes it difficult to make the zoom lens compact.

If f3/fw is not more than the lower limit of the expression (85), the refracting power of the third lens group 23 increases, which makes it impossible to secure a back-focus that allows a crystal filter or the like to be inserted therein, and makes it difficult to correct the spherical aberration. Furthermore, if f3/fw is not less than the upper limit of the expression (85), a Petzval sum increases, thereby making it difficult to correct a field curvature.

If f4/fw is not more than the lower limit of the expression (86), the size of the entire lens system increases, which makes it difficult to make the zoom lens compact. Furthermore, if f4/fw is not less than the upper limit of the expression (86), it is difficult to correct off-axis aberrations both in near photographing and in long-distance photographing at the same time.

Furthermore, in the zoom lens according to the present embodiment, the following expression (87) desirably is satisfied:

$$d12 \times fw < 1.2 \tag{87}$$

where d12 represents a distance between the positive lens 7a and the negative plastic lens 7b of the third lens group 23.

In the case where the expression (87) is satisfied, a chromatic aberration can be corrected excellently in a zooming range from the wide position to the tele position. If d12×fw is not less than the upper limit of the expression (87), the chromatic aberration significantly varies from the wide position to the tele position, thereby significantly deteriorating the performance.

In the zoom lens according to the present embodiment, the following expression (88) desirably is satisfied:

$$(\text{sag}(r1)+\text{sag}(r2)+d8)/d8<4.5 \quad (88)$$

where sag (r1) represents a sag amount between the center of an incident surface of the double-concave lens 6b of the second lens group 22 and a position where the incident surface of the double-concave lens 6b is brought into contact with an outgoing surface of the negative lens 6a disposed on the object side in the second lens group 22, sag (r2) represents a sag amount between the center and an outer-most peripheral portion of the outgoing surface of the double-concave lens 6b, and, d8 denotes a thickness of the double-concave lens 6b.

With satisfaction of the expression (88), the double-concave lens 6b can be formed readily, whereby the yield thereof can be improved. If (sag(r1)+sag(r2)+d8)/d8 is not less than the upper limit of the expression (88), the ratio of a thickness of the central portion of the lens to an edge thickness of the peripheral portion of the lens increases, making it difficult to mold a lens. As a result, the yield is lowered and a low cost of lenses cannot be realized.

Furthermore, desirably the zoom lens according to the present embodiment is configured so that a lens surface closest to the image plane of the first lens group 21 has a radius of curvature equal to a radius of curvature of a lens surface closest to the object of the second lens group 22. This prevents the distance between the surface closest to the image plane of the first lens group 21 and the surface closest to the object of the second lens group 22 from decreasing with increasing proximity to a lens periphery. This facilitates the production of a lens barrel.

Furthermore, in the zoom lens according to the present embodiment, the following expression (89) desirably is satisfied:

$$0.6<BF/fw<1.1 \quad (89)$$

where BF represents an air distance between the image-plane-side surface of the lens closest to the image plane and the image plane.

By satisfying the foregoing expression (89), it is possible to ensure a back-focus necessary for allowing an infrared cut-off filter or a low-pass filter such as a crystal filter to be inserted. Besides, the back-focus is prevented from increasing unnecessarily, which makes it possible to provide a compact zoom lens. If BF/fw is not more than the lower limit of the expression (89), a distance sufficient for allowing an infrared cut-off filter or a low-pass filter such as a crystal filter to be inserted cannot be ensured. On the other hand, if BF/fw is not less than the upper limit of the expression (89), the back-focus excessively increases, thereby making it impossible to provide a compact zoom lens.

EXAMPLE 2

The following Table 4 shows a specific example of the zoom lens according to the present embodiment.

TABLE 4

| Group | Surface | rd | th | nd | ν |
|---|---|---|---|---|---|
| 1 | 1 | 38.45 | 0.90 | 1.80518 | 25.4 |
|   | 2 | 20.52 | 5.10 | 1.58913 | 61.2 |
|   | 3 | −183.44 | 0.15 |   |   |
|   | 4 | 18.54 | 2.70 | 1.60311 | 60.7 |
|   | 5 | 46.73 | variable |   |   |
| 2 | 6 | 46.73 | 0.60 | 1.80500 | 39.6 |
|   | 7 | 4.34 | 2.75 |   |   |
|   | 8* | −8.67 | 1.00 | 1.60602 | 57.8 |
|   | 9 | 5.50 | 2.30 | 1.80518 | 25.5 |
|   | 10 | 65.80 | variable |   |   |
| 3 | 11* | 7.74 | 4.00 | 1.51450 | 63.5 |
|   | 12* | −8.86 | 0.30 |   |   |
|   | 13 | −16.83 | 0.60 | 1.58387 | 30.1 |
|   | 14 | 19.85 | variable |   |   |
| 4 | 15* | 16.72 | 2.80 | 1.54324 | 53.1 |
|   | 16 | −4.90 | 0.70 | 1.58387 | 30.1 |
|   | 17* | −13.59 | variable |   |   |
| 5 | 18 | ∞ | 2.80 | 1.51633 | 64.1 |
|   | 19 | ∞ | — |   |   |

In Table 4, rd represents a radius of curvature (mm) of a lens, th represents a thickness (mm) of a lens or an air distance (mm) between lenses, nd represents a refractive index of each lens with respect to a d-line, and ν represents an abbe number of each lens with respect to the d-line. The shape of an aspherical surface (in Table 4, such a surface is denoted with a mark * attached beside its reference number) is defined by the aforementioned equation (80).

The following Table 5 shows aspherical coefficients of the zoom lens in the present example.

TABLE 5

| Surface | k | D | E | F | G |
|---|---|---|---|---|---|
| 8 | −11.79950 | −2.20951 × 10$^{-3}$ | 1.33194 × 10$^{-4}$ | −1.25908 × 10$^{-5}$ | 5.36379 × 10$^{-7}$ |
| 11 | 0.17661 | −2.65165 × 10$^{-4}$ | 6.26544 × 10$^{-7}$ | 1.06422 × 10$^{-7}$ | 1.35942 × 10$^{-10}$ |
| 12 | 0.10560 | 6.23500 × 10$^{-4}$ | 4.29405 × 10$^{-6}$ | 6.88052 × 10$^{-8}$ | 2.80861 × 10$^{-10}$ |
| 15 | −30.31690 | 5.21270 × 10$^{-4}$ | −9.10874 × 10$^{-6}$ | −8.92635 × 10$^{-7}$ | 3.69895 × 10$^{-8}$ |
| 17 | 0.12809 | −1.23533 × 10$^{-4}$ | 2.35203 × 10$^{-5}$ | −2.46202 × 10$^{-6}$ | 9.65532 × 10$^{-8}$ |

The following Table 6 shows an air distance (mm) that is varied by zooming in the case where an object is positioned at infinity.

TABLE 6

|   | Wide position | Normal position | Tele position |
|---|---|---|---|
| Focal length | 3.010 | 25.627 | 68.915 |
| F No. | 1.688 | 2.490 | 3.355 |
| Angle of view (2ω) | 65.136 | 8.060 | 2.960 |

TABLE 6-continued

|      | Wide position | Normal position | Tele position |
|------|---------------|-----------------|---------------|
| th5  | 0.700         | 16.925          | 20.316        |
| th10 | 20.740        | 4.515           | 1.124         |
| th12 | 8.120         | 2.629           | 8.120         |
| th17 | 2.000         | 7.491           | 2.000         |

The normal position in Table 6 is where the third lens group 23 is placed most closely to the fourth lens group 24 In Table 6, Focal length (mm), F No., and ω(°) represent a focal length, an F number, and an incident angle of view at a wide position, a normal position, and a tele position of the zoom lens of the present example.

Figure 6:
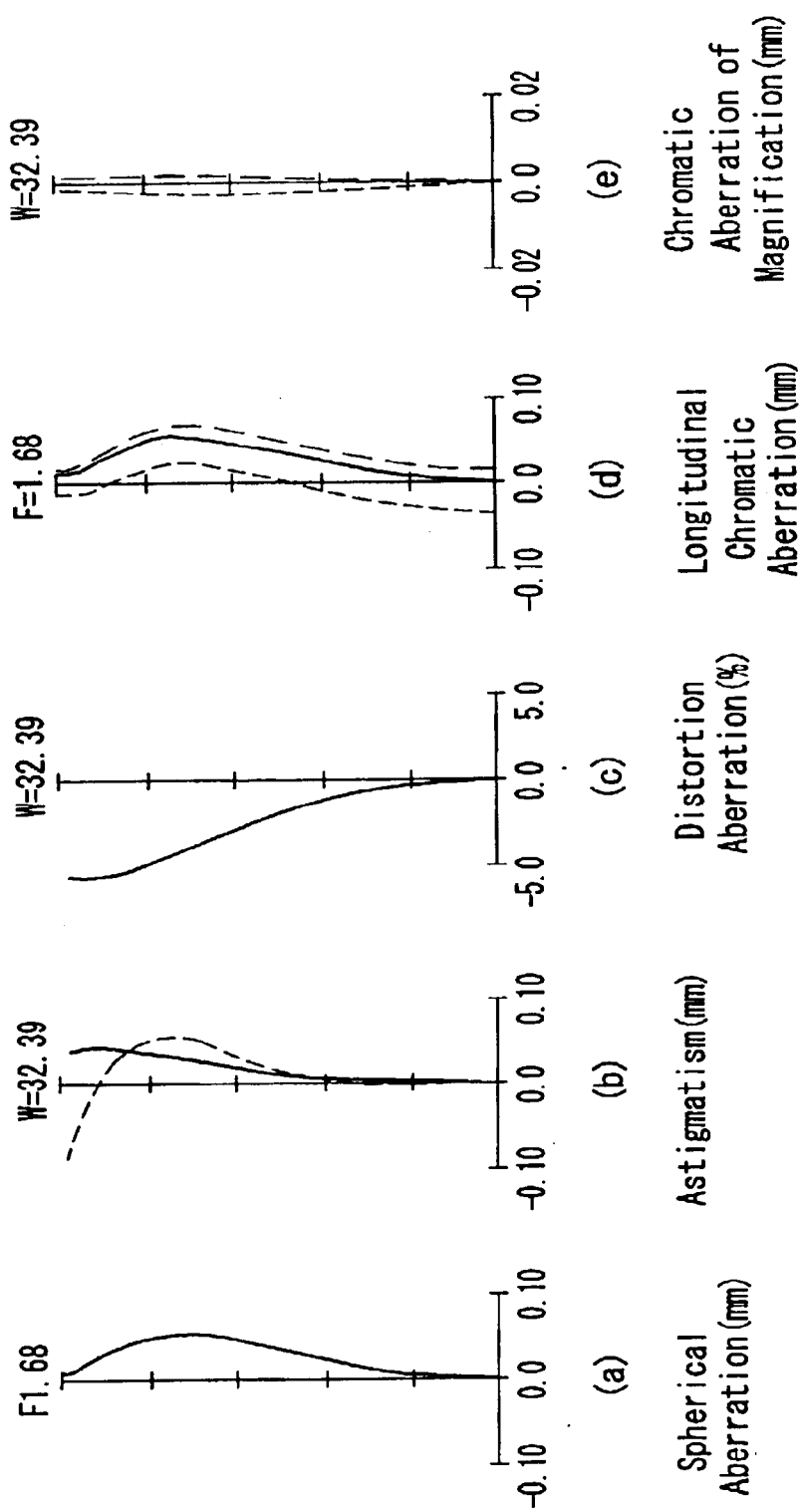
FIGS. 6A to 6E are views showing various aberrations at a wide position of the zoom lens according to Embodiment 2 of the present invention.
Figure 7:
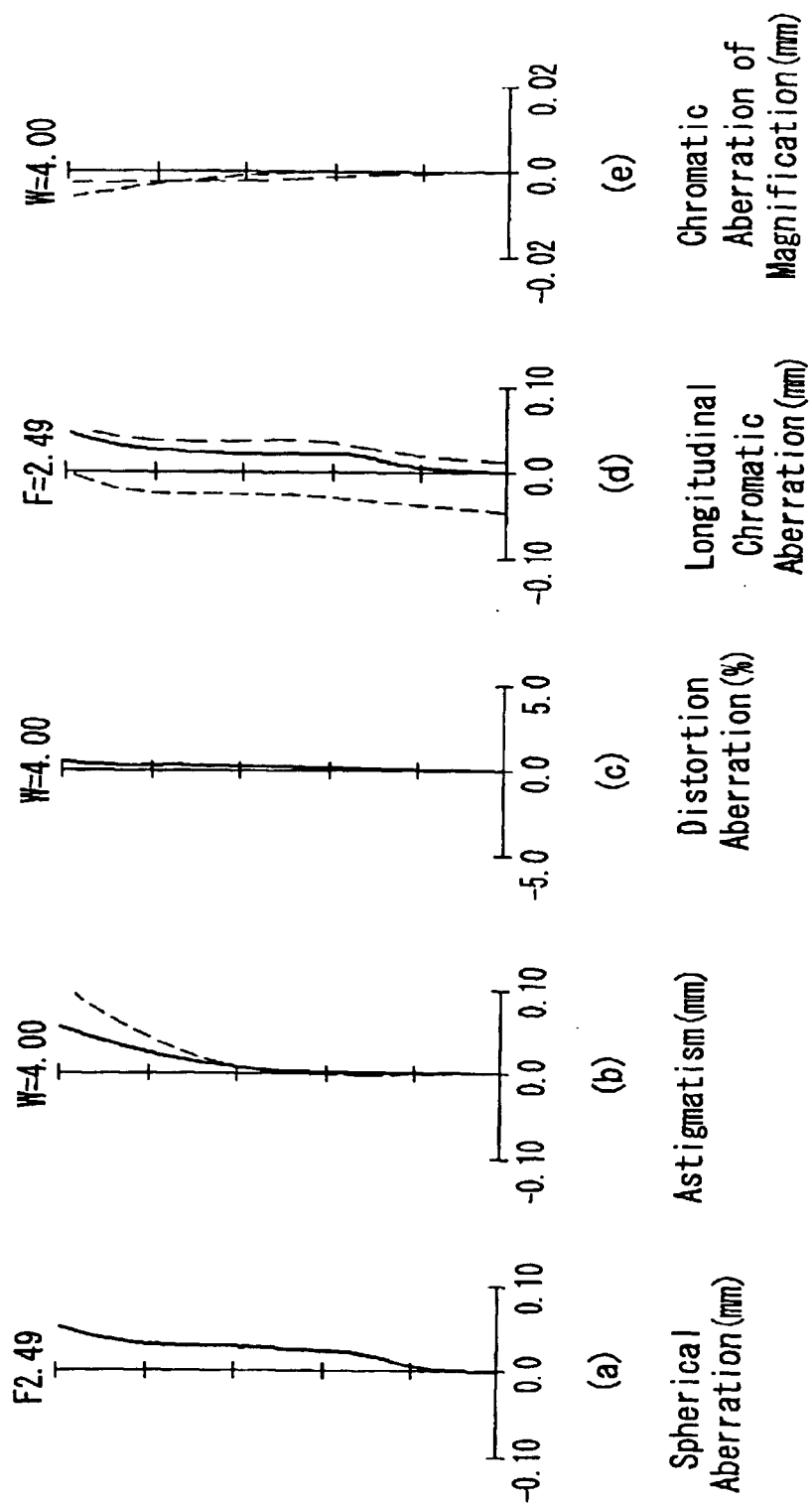
FIGS. 7A to 7E are views showing various aberrations at a normal position of the zoom lens according to Embodiment 2 of the present invention.
Figure 8:
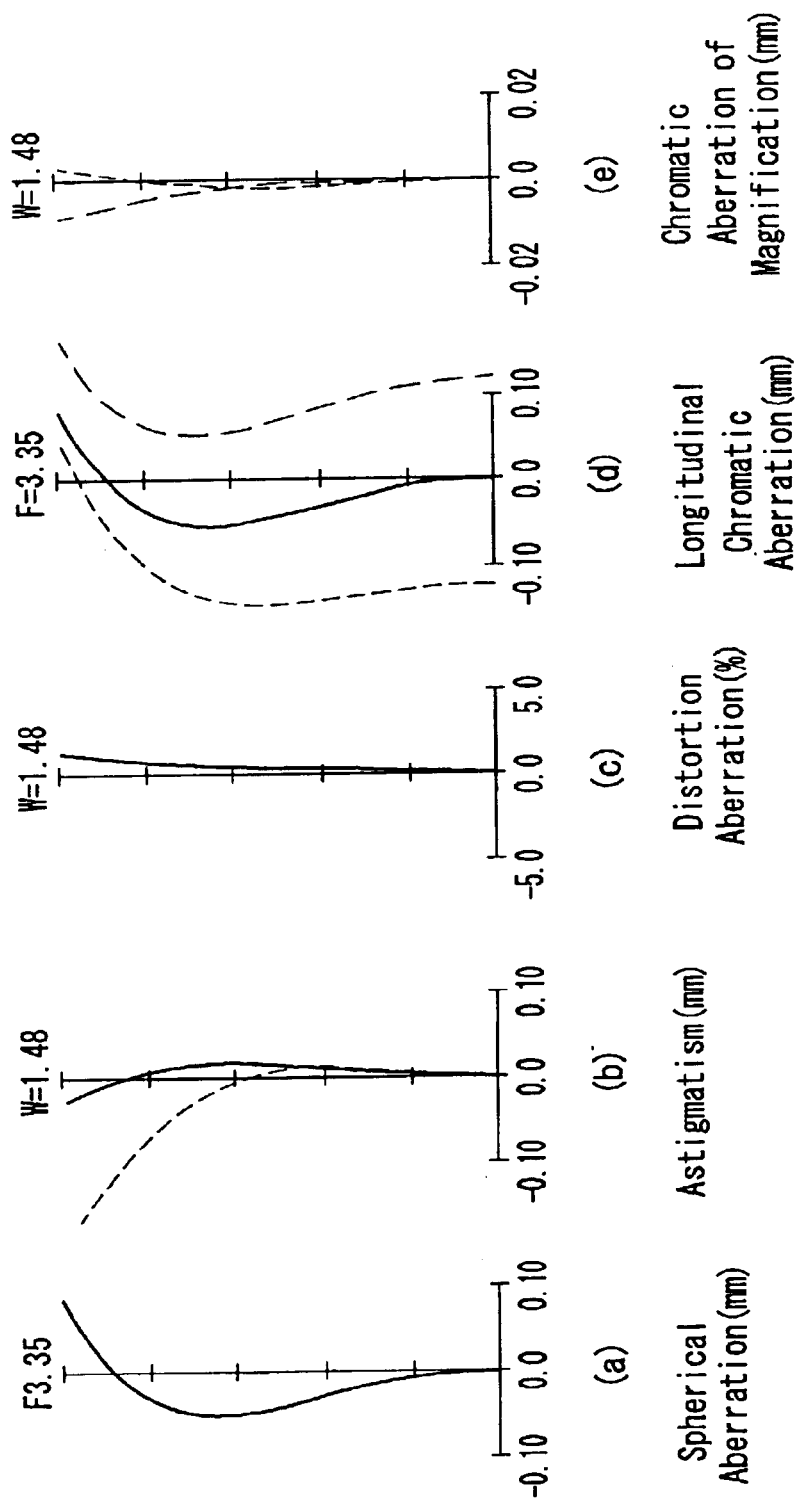
FIGS. 8A to 8E are views showing various aberrations at a tele position of the zoom lens according to Embodiment 2 of the present invention.

FIGS. 6A to 6E, 7A to 7E, and 8A to 8E show performances regarding various aberrations at the wide position, the normal position, and the tele position of the zoom lens shown in the present example, respectively. FIGS. 6A, 7A and 8A show a spherical aberration (mm); FIGS. 6B, 7B and 8B show astigmatism (mm); FIGS. 6C, 7C and 8C show a distortion aberration (%); FIGS. 6D, 7D and 8D show a longitudinal chromatic aberration (mm); and FIGS. 6E, 7E and 8E show a chromatic aberration of magnification (mm). In FIGS. 6B, 7B and 8B showing astigmatism, a solid line represents a sagittal field curvature, and a broken line represents a meridional field curvature. In FIGS. 6D, 7D and 8D showing the longitudinal chromatic aberration and FIGS. 6E, 7E and 8E showing the chromatic aberration of magnification, a solid line represents values with respect to the d-line, a short broken line represents values with respect to an F-line, and a long broken line represents values with respect to a C-line. As is apparent from the drawings regarding these aberrations, the zoom lens of the present example has an excellent aberration performance.

A movement amount of the image plane position according to a change in a refractive index of a plastic lens material caused by a temperature change is 1.0 μm/C.° when the object is positioned at infinity and the zooming position is at the wide position.

[Embodiment 3]

Figure 9:
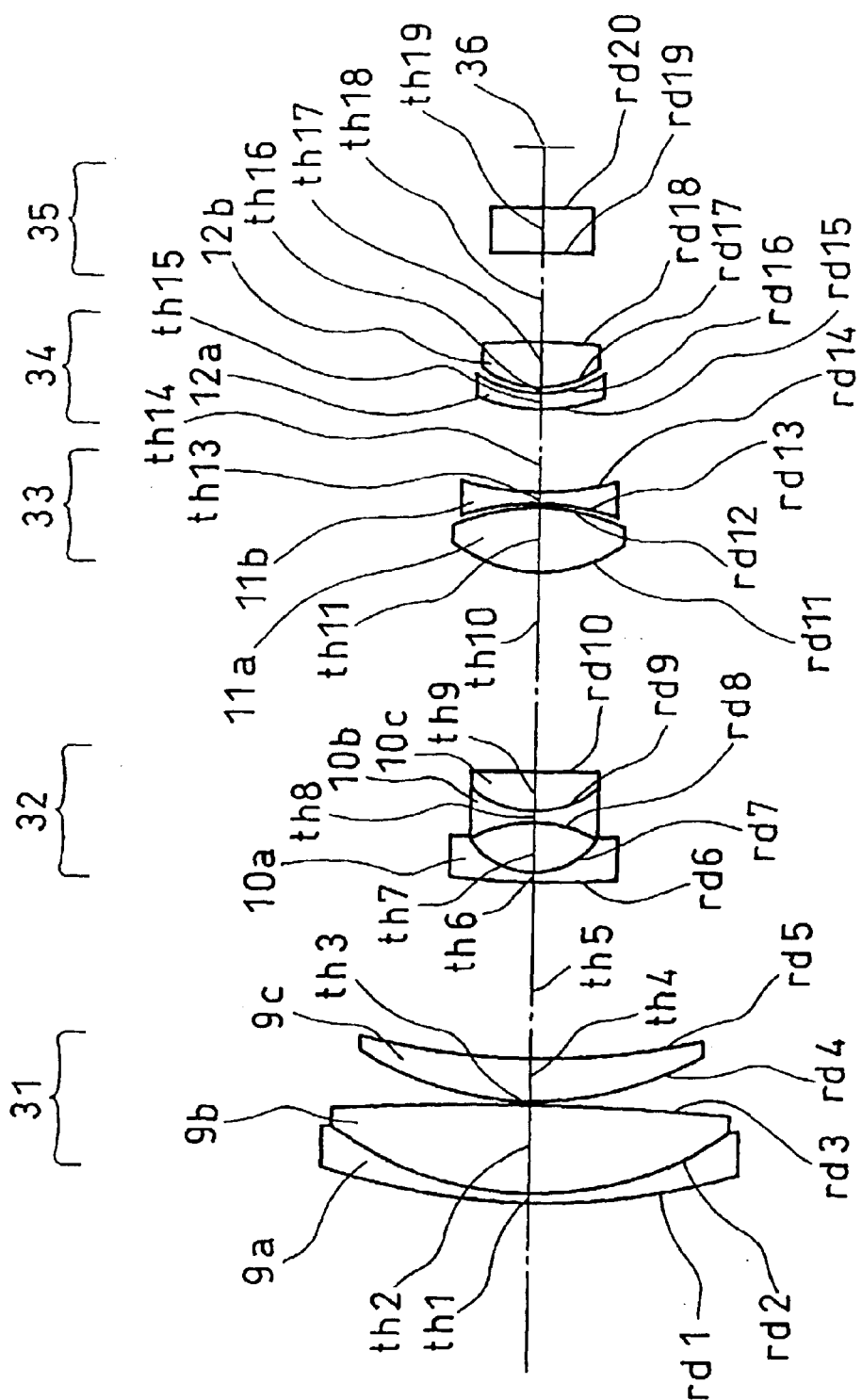
FIG. 9 is a view showing a configuration of a zoom lens according to Embodiment 3 of the present invention.

FIG. 9 is a view showing the arrangement of a zoom lens according to Embodiment 3 of the present invention.

As shown in FIG. 9, the zoom lens has a structure in which a first lens group 31, a second lens group 32, a third lens group 33, a fourth lens group 34, and a glass plate 35 are arranged from an object side (left side in FIG. 9) to an image plane 36 side (right side in FIG. 9) in this order. Here, the glass plate 35 is equivalent optically to a crystal filter or a face plate of an imaging device, etc.

The first lens group 31 has positive refracting power, and is fixed with respect to the image plane 36 even when varying power and focusing. The second lens group 32 has negative refracting power and varies power by moving along an optical axis. The third lens group 33 has positive refracting power, and is fixed with respect to the image plane 36 even when varying power and focusing. The fourth lens group 34 has positive refracting power, and moves along the optical axis so that the image plane 36 varied by the movement of the second lens group 32 and the movement of the object to be imaged is kept at a predetermined position from a reference plane, thereby moving an image and adjusting the focus thereof at the same time in accordance with variable power.

The first lens group 31 is composed of a negative lens 9a, a positive lens 9b, and a positive meniscus lens 9c arranged from the object side in this order, in which the positive meniscus lens 9c has a convex surface on the object side. The second lens group 32 is composed of a negative lens 10a, and a cemented lens of a double-concave lens 10b and a positive lens 10c, which are arranged from the object side in this order, in which at least one of the surfaces of the foregoing lenses is aspherical. The third lens group 33 is composed of a positive lens 11a and a negative plastic lens 11b arranged from the object side in this order, in which at least one of the surfaces of these lenses is aspherical. The fourth lens group 34 is composed of a negative plastic lens 12a and a positive plastic lens 12b that are arranged from the object side in this order, in which at least one of the surfaces of these lenses is aspherical.

In the zoom lens according to the present embodiment, the following expression (90) desirably is satisfied:

$$5 < |(fp1+fp2+fp3)/fw| < 12 \tag{90}$$

where fp1 represents a focal length of the negative plastic lens 11b of the third lens group 33, fp2 represents a focal length of the negative plastic lens 12a of the fourth lens group 34, fp3 represents a focal length of the positive plastic lens 12b of the fourth lens group 34, and fw represents a combined focal length of the entire system at a wide position.

With a configuration that satisfies the expression (90), changes in refractive indices of the plastic lens materials caused by temperature changes can be canceled, whereby a deviation of the image plane position can be decreased. Generally, as properties of a plastic material, a refractive index thereof decreases as the temperature rises and increases as the temperature falls, and the plastic material swells as the temperature rises and shrinks as the temperature falls. In other words, if |(fp1+fp2+fp3)/fw| is not more than the lower limit of the expression (90), a negative-lens tendency increases in the combined focal length of the focal length fp1 of the negative plastic lens 11b of the third lens group 33, and the focal length fp2 of the negative plastic lens 12a and the focal length fp3 of the positive plastic lens 12b of the fourth lens group 34, and with a temperature rise, the image plane position is deviated farthest on the object side at the wide position. On the contrary, with a temperature fall, the image plane position is deviated significantly toward the image plane side at the wide position. This causes a phenomenon in which the fourth lens group 34 moving along the optical axis within a certain moving range so as to keep the image plane at a predetermined position from a reference surface is incapable of doing so as long as it moves within the foregoing moving range, thereby resulting in defocusing. On the other hand, if |(fp1+fp2+fp3)/fw| is not less than the upper limit of the expression (90), a positive-lens tendency increases in the combined focus length of the focus length fp1 of the negative plastic lens 11b of the third lens group 33 and the focus length fp2 of the negative plastic lens 12a and the focus length fp3 of the positive plastic lens 12b of the fourth lens group 34, and with a temperature rise, the image plane position is deviated farthest on the image plane side at the normal position. Therefore, this also results in defocusing.

Furthermore, in the zoom lens of the present embodiment, the following expression (91) desirably is satisfied.

$$7 < |(fp1+fp2+fp3)/fw| < 10.5 \tag{91}$$

By configuring the zoom lens so that the expression (91) above is satisfied, changes in refractive indices of the plastic lens materials caused by temperature changes are canceled, resulting in substantially no deviation of the image plane position occurring.

Furthermore, in the zoom lens according to the present embodiment, the following expressions (92) to (95) desirably are satisfied:

$$9 < f1/fw < 11 \quad (92)$$

$$1 < |f2/fw| < 2 \quad (93)$$

$$4.5 < f3/fw < 6 \quad (94)$$

$$4.5 < f4/fw < 6.5 \quad (95)$$

where f1 represents a combined focal length of the first lens group 31, f2 represents a combined focal length of the second lens group 32, f3 represents a combined focal length of the third lens group 33, and f4 represents a combined focal length of the fourth lens group 34.

In the case where the expressions (92) to (95) are satisfied, the zoom lens is configured to be compact, with aberration performances excellently adjusted.

If f1/fw is not more than the lower limit of the expression (92), the first lens group 31 has an excessive refracting power, which makes it difficult to correct a spherical aberration at the side of the long focal length and an off-axis coma-aberration. Besides, if f1/fw is not less than the upper limit of the expression (92), the full length of the lens increases, which makes it difficult to make the zoom lens compact.

If |f2/fw| is not more than the lower limit of the expression (93), a Petzval sum of the entire system increases, so that a field curvature cannot be corrected. If |f2/fw| is not less than the upper limit of the expression (93), the Petzval sum decreases, but the length of the entire system increases, which makes it difficult to make the zoom lens compact.

If f3/fw is not more than the lower limit of the expression (94), the refracting power of the third lens group 33 increases, which makes it impossible to secure a back-focus that allows a crystal filter or the like to be inserted therein, and makes it difficult to correct the spherical aberration. Furthermore, if f3/fw is not less than the upper limit of the expression (94), a Petzval sum increases, thereby making it difficult to correct a field curvature.

If f4/fw is not more than the lower limit of the expression (95), the size of the entire lens system increases, which makes it difficult to make the zoom lens compact. Furthermore, if f4/fw is not less than the upper limit of the expression (95), it is difficult to correct off-axis aberrations both in near photographing and in long-distance photographing at the same time Furthermore, in the zoom lens according to the present embodiment, the following expression (96) desirably is satisfied:

$$d12 \times fw < 1.2 \quad (96)$$

where d12 represents a distance between the positive lens 11a and the negative plastic lens 11b of the third lens group 33.

In the case where the expression (96) is satisfied, a chromatic aberration can be corrected excellently in a zooming range from the wide position to the tele position. If d12×fw is not less than the upper limit of the expression (96), the chromatic aberration significantly varies from the wide position to the tele position, thereby significantly deteriorating the performance.

In the zoom lens according to the present embodiment, the following expression (97) desirably is satisfied:

$$(\text{sag}(r1) + \text{sag}(r2) + d8)/d8 < 4.5 \quad (97)$$

where sag (r1) represents a sag amount between the center of an incident surface of the double-concave lens 10b of the second lens group 32 and a position where the incident surface of the double-concave lens 10b is brought into contact with an outgoing surface of the negative lens 10a disposed on the object side in the second lens group 32, sag (r2) represents a sag amount between the center and an outer-most peripheral portion of the outgoing surface of the double-concave lens 10b, and, d8 denotes a thickness of the double-concave lens 10b.

With satisfaction of the expression (97), the double-concave lens 10b can be formed readily, whereby the yield thereof can be improved. If (sag(r1)+sag(r2)+d8)/d8 is not less than the upper limit of the expression (97), the ratio of a thickness of the central portion of the lens to an edge thickness of the peripheral portion of the lens increases, making it difficult to mold a lens. As a result, the yield is lowered and a low cost of lenses cannot be realized.

Furthermore, desirably the zoom lens according to the present embodiment is configured so that a lens surface closest to the image plane of the first lens group 31 has a radius of curvature equal to a radius of curvature of a lens surface closest to the object of the second lens group 32. This prevents the distance between the surface closest to the image plane of the first lens group 31 and the surface closest to the object of the second lens group 32 from decreasing with increasing proximity to a lens periphery. This facilitates the production of a lens barrel.

Furthermore, in the zoom lens according to the present embodiment, the following expression (98) desirably is satisfied:

$$0.6 < BF/fw < 1.1 \quad (98)$$

where BF represents an air distance between the image-plane-side surface of the lens closest to the image plane and the image plane.

By satisfying the foregoing expression (98), it is possible to ensure a back-focus necessary for allowing an infrared cut-off filter or a low-pass filter such as a crystal filter to be inserted. Besides, the back-focus is prevented from increasing unnecessarily, which makes it possible to provide a compact zoom lens. If BF/fw is not more than the lower limit of the expression (98), a distance sufficient for allowing an infrared cut-off filter or a low-pass filter such as a crystal filter to be inserted cannot be ensured. On the other hand, if BF/fw is not less than the upper limit of the expression (98), the back-focus excessively increases, thereby making it impossible to provide a compact zoom lens.

EXAMPLE 3

The following Table 7 shows a specific example of the zoom lens according to the present embodiment.

TABLE 7

| Group | Surface | rd | th | nd | ν |
|---|---|---|---|---|---|
| 1 | 1 | 39.25 | 0.80 | 1.80518 | 25.4 |
|   | 2 | 20.47 | 5.10 | 1.58913 | 61.2 |
|   | 3 | −171.50 | 0.20 |   |   |
|   | 4 | 18.24 | 2.75 | 1.60311 | 60.7 |
|   | 5 | 45.42 | variable |   |   |
| 2 | 6 | 45.42 | 0.60 | 1.80500 | 39.6 |
|   | 7 | 4.30 | 2.70 |   |   |

TABLE 7-continued

| Group | Surface | rd | th | nd | ν |
|---|---|---|---|---|---|
| | 8* | −8.58 | 0.90 | 1.60602 | 57.8 |
| | 9 | 5.51 | 2.30 | 1.80518 | 25.5 |
| | 10 | 73.39 | variable | | |
| 3 | 11* | 8.63 | 3.80 | 1.60602 | 57.8 |
| | 12* | −9.39 | 0.20 | | |
| | 13 | −13.38 | 0.70 | 1.58387 | 30.1 |
| | 14 | 16.47 | variable | | |
| 4 | 15* | 10.28 | 1.00 | 1.58387 | 30.1 |
| | 16 | 6.00 | 0.30 | | |
| | 17 | 5.70 | 2.80 | 1.49178 | 57.2 |
| | 18* | −22.98 | variable | | |
| 5 | 19 | ∞ | 2.80 | 1.51633 | 64.1 |
| | 20 | ∞ | | | |

In Table 7, rd represents a radius of curvature (mm) of a lens, th represents a thickness (mm) of a lens or an air distance (mm) between lenses, nd represents a refractive index of each lens with respect to a d-line, and ν represents an abbe number of each lens with respect to the d-line. The shape of an aspherical surface (in Table 7, such a surface is denoted with a mark * attached beside its reference number) is defined by the aforementioned equation (80).

The following Table 8 shows aspherical coefficients of the zoom lens in the present example.

TABLE 8

| Surface | k | D | E | F | G |
|---|---|---|---|---|---|
| 8 | −11.79950 | −2.20951 × 10$^{-3}$ | 1.33194 × 10$^{-4}$ | −1.25908 × 10$^{-5}$ | 5.36379 × 10$^{-7}$ |
| 11 | 0.69201 | −2.54836 × 10$^{-4}$ | −3.96421 × 10$^{-5}$ | 3.21063 × 10$^{-7}$ | −6.30435 × 10$^{-9}$ |
| 12 | 0.49478 | 5.43522 × 10$^{-4}$ | 3.05097 × 10$^{-6}$ | 2.39230 × 10$^{-7}$ | −4.48837 × 10$^{-9}$ |
| 17 | −0.44842 | 9.83921 × 10$^{-5}$ | 6.00419 × 10$^{-6}$ | 1.99002 × 10$^{-8}$ | −9.74119 × 10$^{-8}$ |
| 18 | −108.49600 | −6.70268 × 10$^{-4}$ | 8.89076 × 10$^{-5}$ | −1.15393 × 10$^{-6}$ | −4.33822 × 10$^{-8}$ |

The following Table 9 shows an air distance (mm) that is varied by zooming in the case where an object is positioned at infinity.

TABLE 9

| | Wide position | Normal position | Tele position |
|---|---|---|---|
| Focal length | 3.010 | 26.710 | 69.512 |
| F No. | 1.688 | 2.485 | 3.385 |
| Angle of view (2ω) | 65.136 | 7.730 | 2.948 |
| th5 | 0.700 | 16.950 | 20.341 |
| th10 | 20.740 | 4.412 | 1.099 |
| th12 | 8.120 | 2.538 | 8.120 |
| th17 | 2.000 | 7.582 | 2.000 |

The normal position in Table 9 is where the third lens group 33 is placed most closely to the fourth lens group 34 In Table 9, Focal length (mm), F No., and ω(°) represent a focal length, an F number, and an incident angle of view at a wide position, a normal position, and a tele position of the zoom lens of the present example.

Figure 10:
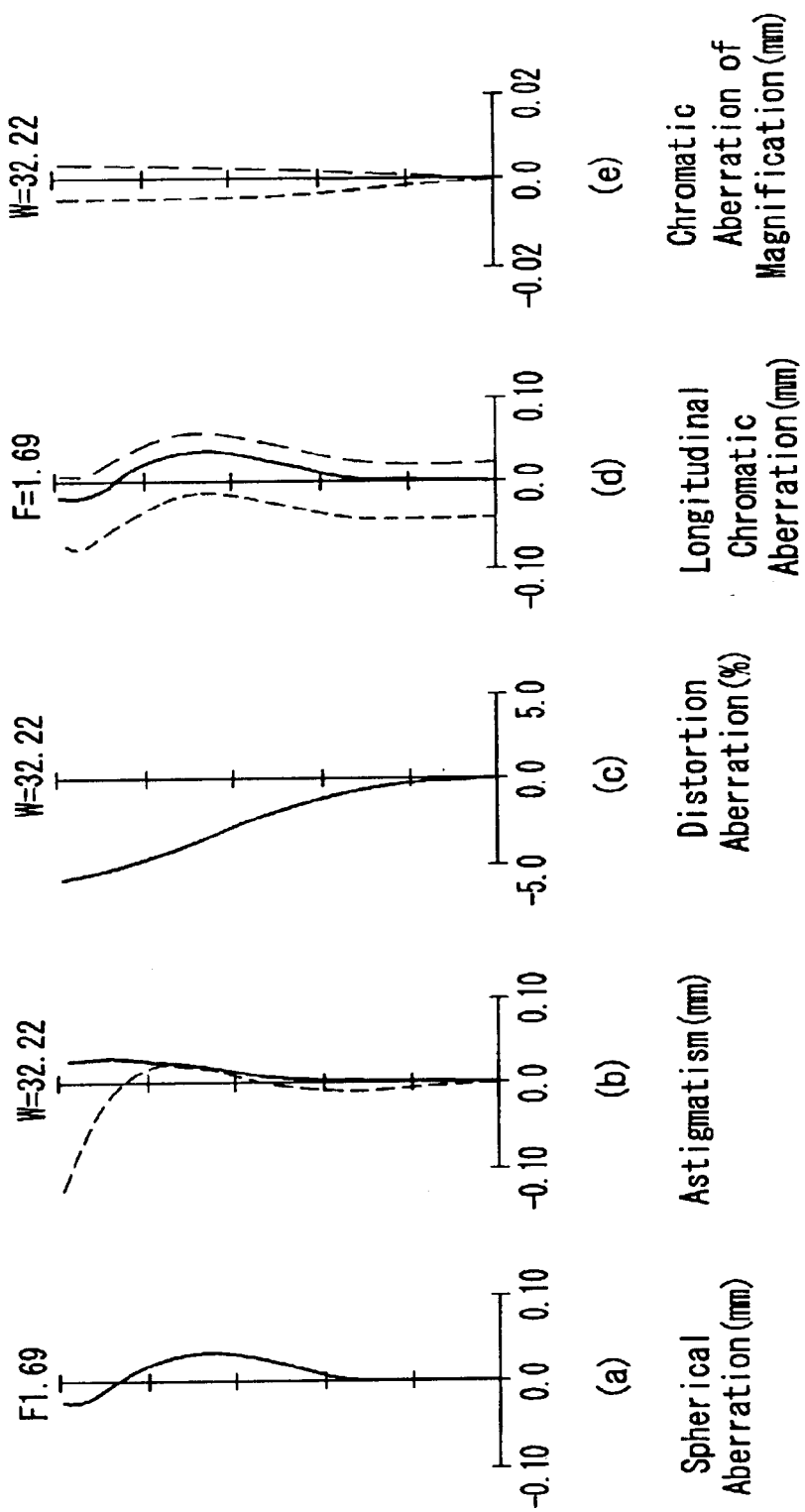
FIGS. 10A to 10E are views showing various aberrations at a wide position of the zoom lens according to Embodiment 3 of the present invention.
Figure 11:
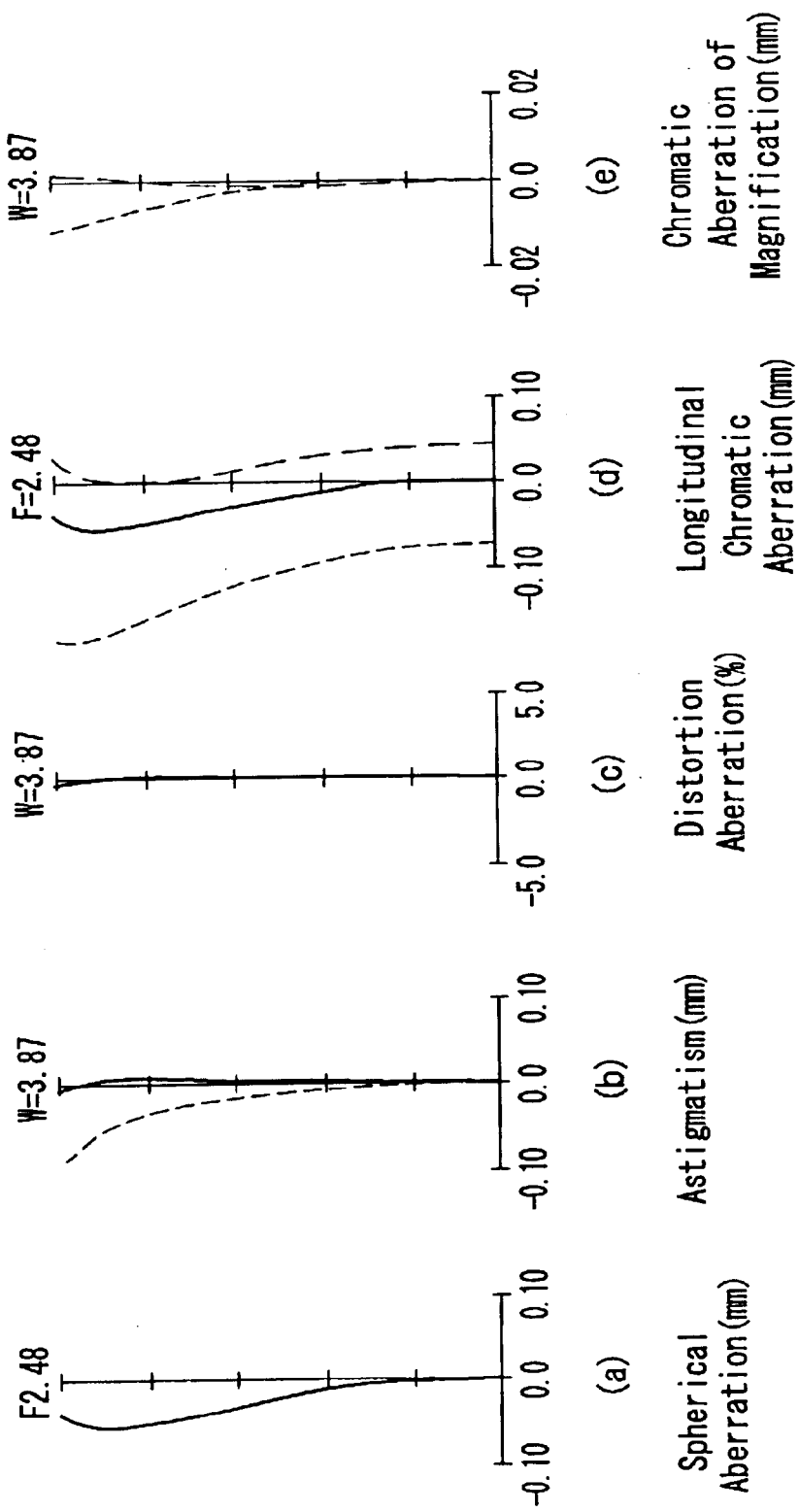
FIGS. 11A to 11E are views showing various aberrations at a normal position of the zoom lens according to Embodiment 3 of the present invention.
Figure 12:
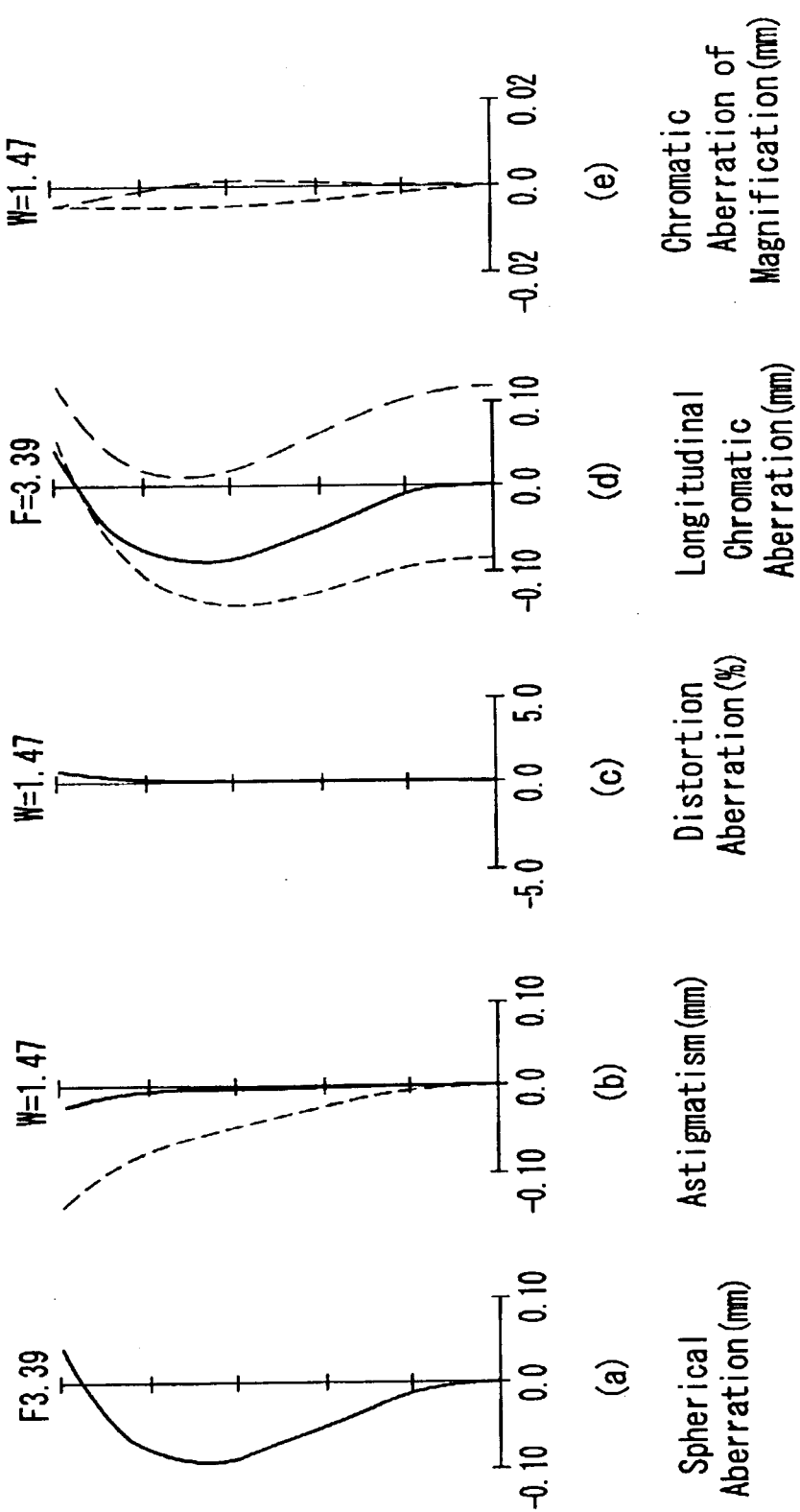
FIGS. 12A to 12E are views showing various aberrations at a tele position of the zoom lens according to Embodiment 3 of the present invention.

FIGS. 10A to 10E, 11A to 11E, and 12A to 12E show performances regarding various aberrations at the wide position, the normal position, and the tele position of the zoom lens shown in the present example, respectively, FIGS. 10A, 11A and 12A show a spherical aberration (mm); FIGS. 10B, 11B and 12B show astigmatism (mm); FIGS. 10C, 11C and 12C show a distortion aberration (%); FIGS. 10D, 11D and 12D show a longitudinal chromatic aberration (mm); and FIGS. 10E, 11E and 12E show a chromatic aberration of magnification (mm). In FIGS. 10B, 11B and 12B showing astigmatism, a solid line represents a sagittal field curvature, and a broken line represents a meridional field curvature. In FIGS. 10D, 11D and 12D showing the longitudinal chromatic aberration and FIGS. 10E, 11E and 12E showing the chromatic aberration of magnification, a solid line represents values with respect to the d-line, a short broken line represents values with respect to an F-line, and a long broken line represents values with respect to a C-line. As is apparent from the drawings regarding these aberrations, the zoom lens of the present example has an excellent aberration performance.

A movement amount of the image plane position according to a change in a refractive index of a plastic lens material caused by a temperature change is 1.2 μm/C.° when the object is positioned at infinity and the zooming position is at the wide position.

[Embodiment 4]

Figure 13:
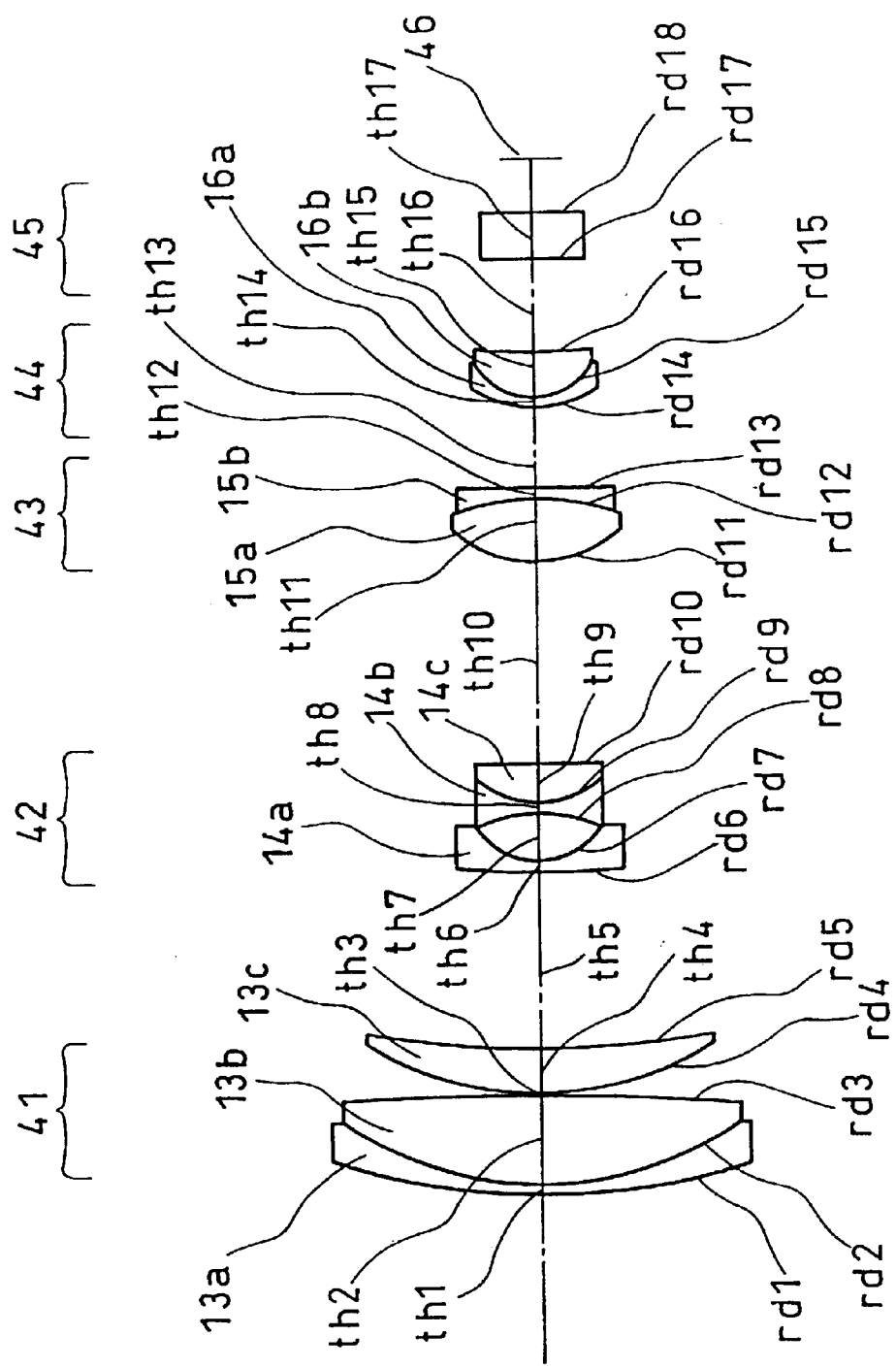
FIG. 13 is a view showing a configuration of a zoom lens according to Embodiment 4 of the present invention.

FIG. 13 is a view showing the arrangement of a zoom lens according to Embodiment 4 of the present invention.

As shown in FIG. 13, the zoom lens has a structure in which a first lens group 41, a second lens group 42, a third lens group 43, a fourth lens group 44, and a glass plate 45 are arranged from an object side (left side in FIG. 13) to an image plane 46 side (right side in FIG. 13) in this order. Here, the glass plate 45 is equivalent optically to a crystal filter or a face plate of an imaging device, etc.

The first lens group 41 has positive refracting power, and is fixed with respect to the image plane 46 even when varying power and focusing. The second lens group 42 has negative refracting power and varies power by moving along an optical axis. The third lens group 43 has positive refracting power, and is fixed with respect to the image plane 46 even when varying power and focusing. The fourth lens group 44 has positive refracting power, and moves along the optical axis so that the image plane 46 varied by the movement of the second lens group 42 and the movement of the object to be imaged is kept at a predetermined position from a reference plane, thereby moving an image and adjusting the focus thereof at the same time in accordance with variable power.

The first lens group 41 is composed of a negative lens 13a, a positive lens 13b, and a positive meniscus lens 13c arranged from the object side in this order, in which the positive meniscus lens 13c has a convex surface on the object side. The second lens group 42 is composed of a negative lens 14a, and a cemented lens of a double-concave lens 14b and a positive lens 14c, which are arranged from the object side in this order, in which at least one of the surfaces of the foregoing lenses is aspherical. The third lens group 43 is a cemented lens composed of a positive lens 15a and a negative plastic lens 15b arranged from the object side in this order, in which at least one of the surfaces of these lenses is aspherical. The fourth lens group 44 is a cemented lens composed of a negative plastic lens 16a and a positive plastic lens 16b that are arranged from the object side in this order, in which at least one of the surfaces of these lenses is aspherical.

In the zoom lens according to the present embodiment, the following expression (99) is satisfied:

$$5 < |(fp1+fp2+fp3)/fw| < 12 \qquad (99)$$

where fp1 represents a focal length of the negative plastic lens 15b of the third lens group 43, fp2 represents a focal length of the negative plastic lens 16a of the fourth lens group 44, fp3 represents a focal length of the positive plastic lens 16b of the fourth lens group 44, and fw represents a combined focal length of the entire system at a wide position.

With such a configuration that satisfies the expression (99), changes in refractive indices of the plastic lens materials caused by temperature changes can be canceled, whereby a deviation of the image plane position can be decreased. Generally, as properties of a plastic material, a refractive index thereof decreases as the temperature rises and increases as the temperature falls, and the plastic material swells as the temperature rises and shrinks as the temperature falls. In other words, if |(fp1+fp2+fp3)/fw| is not more than the lower limit of the expression (99), a negative-lens tendency increases in the combined focal length of the focal length fp1 of the negative plastic lens 15b of the third lens group 43, and the focal length fp2 of the negative plastic lens 16a and the focal length fp3 of the positive plastic lens 16b of the fourth lens group: 44, and with a temperature rise, the image plane position is deviated farthest on the object side at the wide position. On the contrary, with a temperature fall, the image plane position is deviated significantly toward the image plane side at the wide position. This causes a phenomenon in which the fourth lens group 44 moving along the optical axis within a certain moving range so as to keep the image plane at a predetermined position from a reference surface is incapable of doing so as long as it moves within the foregoing moving range, thereby resulting in defocusing. On the other hand, if |(fp1+fp2+fp3)/fw| is not less than the upper limit of the expression (99), a positive-lens tendency increases in the combined focus length of the focus length fp1 of the negative plastic lens 15b of the third lens group 43 and the focus length fp2 of the negative plastic lens 16a and the focus length fp3 of the positive plastic lens 16b of the fourth lens group 44, and with a temperature rise, the image plane position is deviated farthest on the image plane side at the normal position. Therefore, this also results in defocusing.

Furthermore, in the zoom lens of the present embodiment, the following expression (100) desirably is satisfied.

$$7 < |(fp1+fp2+fp3)/fw| < 10.5 \qquad (100)$$

With such a configuration of the zoom lens that satisfies the expression (100) above, changes in refractive indices of the plastic lens materials caused by temperature changes are canceled, resulting in substantially no deviation of the image plane position occurring.

Furthermore, in the zoom lens according to the present embodiment, the following expressions (101) to (104) desirably are satisfied:

$$9 < f1/fw < 11 \qquad (101)$$

$$1 < |f2/fw| < 2 \qquad (102)$$

$$4.5 < f3/fw < 6 \qquad (103)$$

$$4.5 < f4/fw < 6.5 \qquad (104)$$

where f1 represents a combined focal length of the first lens group 41, f2 represents a combined focal length of the second lens group 42, f3 represents a combined focal length of the third lens group 43, and f4 represents a combined focal length of the fourth lens group 44.

In the case where the expressions (101) to (104) are satisfied, the zoom lens is configured to be compact, with aberration performances excellently adjusted.

If f1/fw is not more than the lower limit of the expression (101), the first lens group 41 has an excessive refracting power, which makes it difficult to correct a spherical aberration at the side of the long focal length and an off-axis coma-aberration. Besides, if f1/fw is not less than the upper limit of the expression (101), the full length of the lens increases, which makes it difficult to make the zoom lens compact.

If |f2/fw| is not more than the lower limit of the expression (102), a Petzval sum of the entire system increases, so that a field curvature cannot be corrected. If |f2/fw| is not less than the upper limit of the expression (102), the Petzval sum decreases, but the length of the entire system increases, which makes it difficult to make the zoom lens compact.

If f3/fw is not more than the lower limit of the expression (103), the refracting power of the third lens group 43 increases, which makes it impossible to secure a back-focus that allows a crystal filter or the like to be inserted therein, and makes it difficult to correct the spherical aberration. Furthermore, if f3/fw is not less than the upper limit of the expression (103), a Petzval sum increases, thereby making it difficult to correct a field curvature.

If f4/fw is not more than the lower limit of the expression (104), the size of the entire lens system increases, which makes it difficult to make the zoom lens compact. Furthermore, if f4/fw is not less than the upper limit of the expression (104), it is difficult to correct off-axis aberrations both in near photographing and in long-distance photographing at the same time.

In the zoom lens according to the present embodiment, the following expression (105) desirably is satisfied:

$$(\text{sag}(r1)+\text{sag}(r2)+d8)/d8 < 4.5 \qquad (105)$$

where sag (r1) represents a sag amount between the center of an incident surface of the double-concave lens 14b of the second lens group 42 and a position where the incident surface of the double-concave lens 14b is brought into contact with an outgoing surface of the negative lens 14a disposed on the object side in the second lens group 42, sag (r2) represents a sag amount between the center and an outer-most peripheral portion of the outgoing surface of the double-concave lens 14b, and d8 denotes a thickness of the double-concave lens 14b.

With satisfaction of the expression (105), the double-concave lens 14b can be formed readily, whereby the yield thereof can be improved. If (sag(r1)+sag(r2)+d8)/d8 is not less than the upper limit of the expression (105), the ratio of a thickness of the central portion of the lens to an edge thickness of the peripheral portion of the lens increases, making it difficult to mold a lens. As a result, the yield is lowered and a low cost of lenses cannot be realized.

Furthermore, desirably the zoom lens according to the present embodiment is configured so that a lens surface closest to the image plane of the first lens group 41 has a radius of curvature equal to a radius of curvature of a lens surface closest to the object of the second lens group 42. This prevents the distance between the surface closest to the image plane of the first lens group 41 and the surface closest to the object of the second lens group 42 from decreasing with increasing proximity to a lens periphery. This facilitates the production of a lens barrel.

Furthermore, in the zoom lens according to the present embodiment, the following expression (106) desirably is satisfied:

$$0.6 < BF/fw < 1.1 \quad (106)$$

where BF represents an air distance between the image-plane-side surface of the lens closest to the image plane of lens and the image plane.

By satisfying the foregoing expression (106), it is possible to ensure a back-focus necessary for allowing an infrared cut-off filter or a low-pass filter such as a crystal filter to be inserted. Besides, the back-focus is prevented from increasing unnecessarily, which makes it possible to provide a compact zoom lens. If BF/fw is not more than the lower limit of the expression (106), a distance sufficient for allowing an infrared cut-off filter or a low-pass filter such as a crystal filter to be inserted cannot be ensured. On the other hand, if BF/fw is not less than the upper limit of the expression (106), the back-focus excessively increases, thereby making it impossible to provide a compact zoom lens.

EXAMPLE 4

The following Table 10 shows a specific example of the zoom lens according to the present embodiment.

TABLE 10

| Group | Surface | rd | th | nd | ν |
|---|---|---|---|---|---|
| 1 | 1 | 37.65 | 0.80 | 1.80518 | 25.4 |
|  | 2 | 20.21 | 5.05 | 1.58913 | 61.2 |
|  | 3 | −234.89 | 0.15 |  |  |
|  | 4 | 18.83 | 2.75 | 1.60311 | 60.7 |
|  | 5 | 50.63 | variable |  |  |
| 2 | 6 | 50.63 | 0.60 | 1.80500 | 39.6 |
|  | 7 | 4.37 | 2.71 |  |  |
|  | 8* | −8.55 | 0.80 | 1.60602 | 57.8 |
|  | 9 | 5.48 | 2.20 | 1.80518 | 25.5 |
|  | 10 | 72.19 | variable |  |  |
| 3 | 11* | 8.11 | 3.70 | 1.60602 | 57.8 |
|  | 12 | −13.22 | 0.60 | 1.58387 | 30.1 |
|  | 13* | 42.40 | variable |  |  |
| 4 | 14* | 6.90 | 0.60 | 1.58387 | 30.1 |
|  | 15 | 3.89 | 2.70 | 1.49178 | 57.2 |
|  | 16* | 100.22 | variable |  |  |
|  | 17 | ∞ | 2.80 | 1.51633 | 64.1 |
| 5 | 18 | ∞ | — |  |  |

In Table 10, rd represents a radius of curvature (mm) of a lens, th represents a thickness (mm) of a lens or an air distance (mm) between lenses, nd represents a refractive index of each lens with respect to a d-line, and ν represents an abbe number of each lens with respect to the d-line. The shape of an aspherical surface (in Table 10, such a surface is denoted with a mark * attached beside its reference number) is defined by the aforementioned equation (80).

The following Table 11 shows aspherical coefficients of the zoom lens in the present example.

TABLE 11

| Surface | k | D | E | F | G |
|---|---|---|---|---|---|
| 8 | −11.84580 | −2.22011 × 10$^{-3}$ | 1.32305 × 10$^{-4}$ | −1.26272 × 10$^{-5}$ | 5.38080 × 10$^{-7}$ |
| 11 | 0.72114 | −1.21990 × 10$^{-4}$ | 3.28842 × 10$^{-7}$ | 3.36737 × 10$^{-7}$ | −1.10588 × 10$^{-8}$ |
| 12 | 30.05691 | 4.72068 × 10$^{-4}$ | 1.40761 × 10$^{-5}$ | 8.39921 × 10$^{-7}$ | −7.60437 × 10$^{-9}$ |
| 14 | −0.04235 | 8.01700 × 10$^{-5}$ | 3.49848 × 10$^{-5}$ | 4.26612 × 10$^{-7}$ | −4.73729 × 10$^{-8}$ |
| 16 | 263.25400 | 4.07337 × 10$^{-4}$ | 8.48037 × 10$^{-5}$ | −6.68023 × 10$^{-7}$ | −1.49323 × 10$^{-7}$ |

The following Table 12 shows an air distance (mm) that is varied by zooming in the case where an object is positioned at infinity.

TABLE 12

|  | Wide position | Normal position | Tele position |
|---|---|---|---|
| Focal length | 3.010 | 28.046 | 69.068 |
| F No. | 1.688 | 2.450 | 3.373 |
| Angle of view (2ω) | 65.136 | 7.300 | 2.960 |
| th5 | 0.700 | 16.949 | 20.341 |
| th10 | 20.740 | 4.491 | 1.099 |
| th12 | 8.120 | 2.055 | 8.120 |
| th17 | 2.000 | 8.065 | 2.000 |

The normal position in Table 12 is where the third lens group 43 is placed most closely to the fourth lens group 44 In Table 12, Focal length (mm), F No., and ω(°) represent a focal length, an F number, and an incident angle of view at a wide position, a normal position, and a tele position of the zoom lens of the present example.

Figure 14:
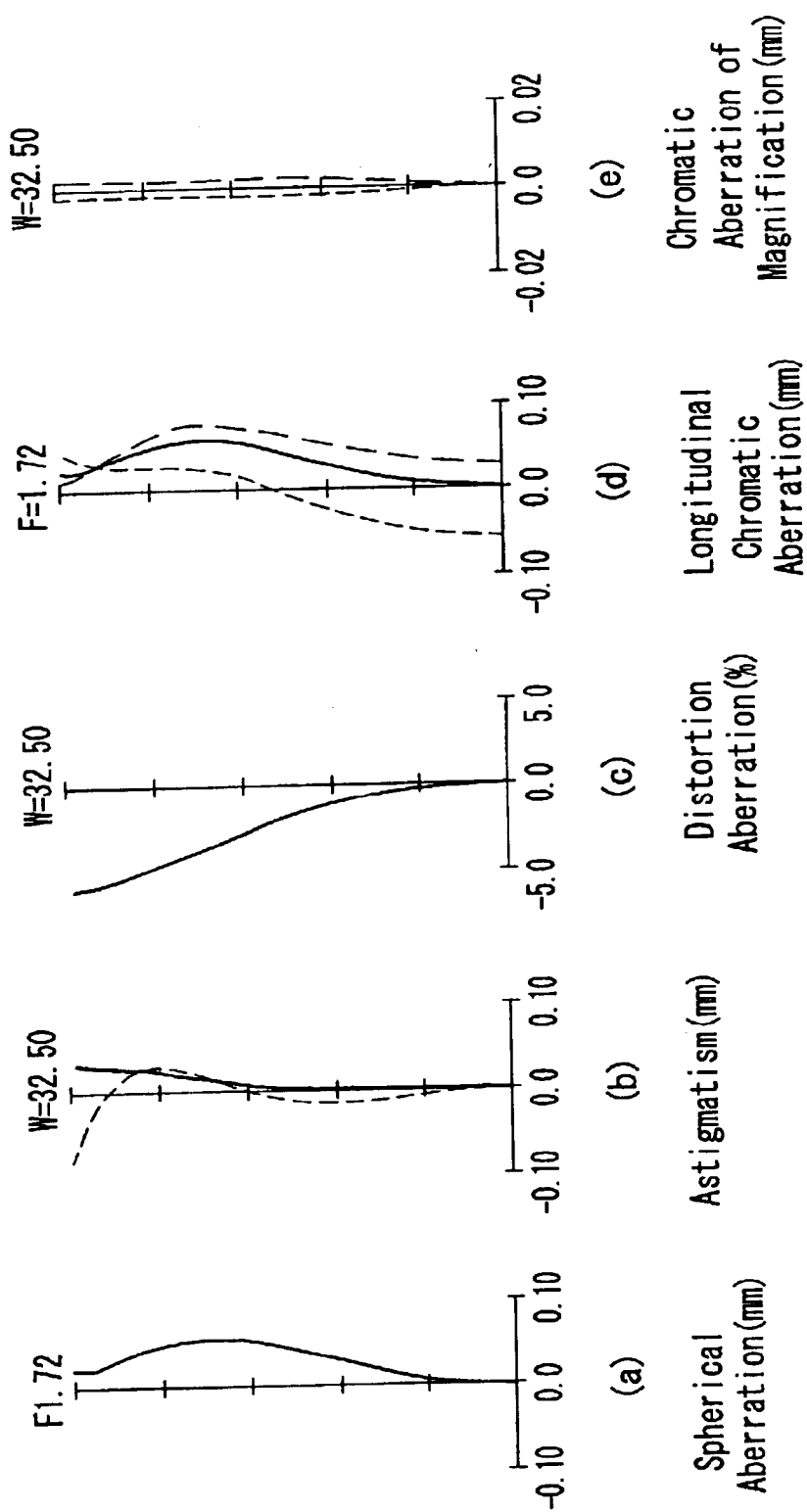
FIGS. 14A to 14E are views showing various aberrations at a wide position of the zoom lens according to Embodiment 4 of the present invention.
Figure 15:
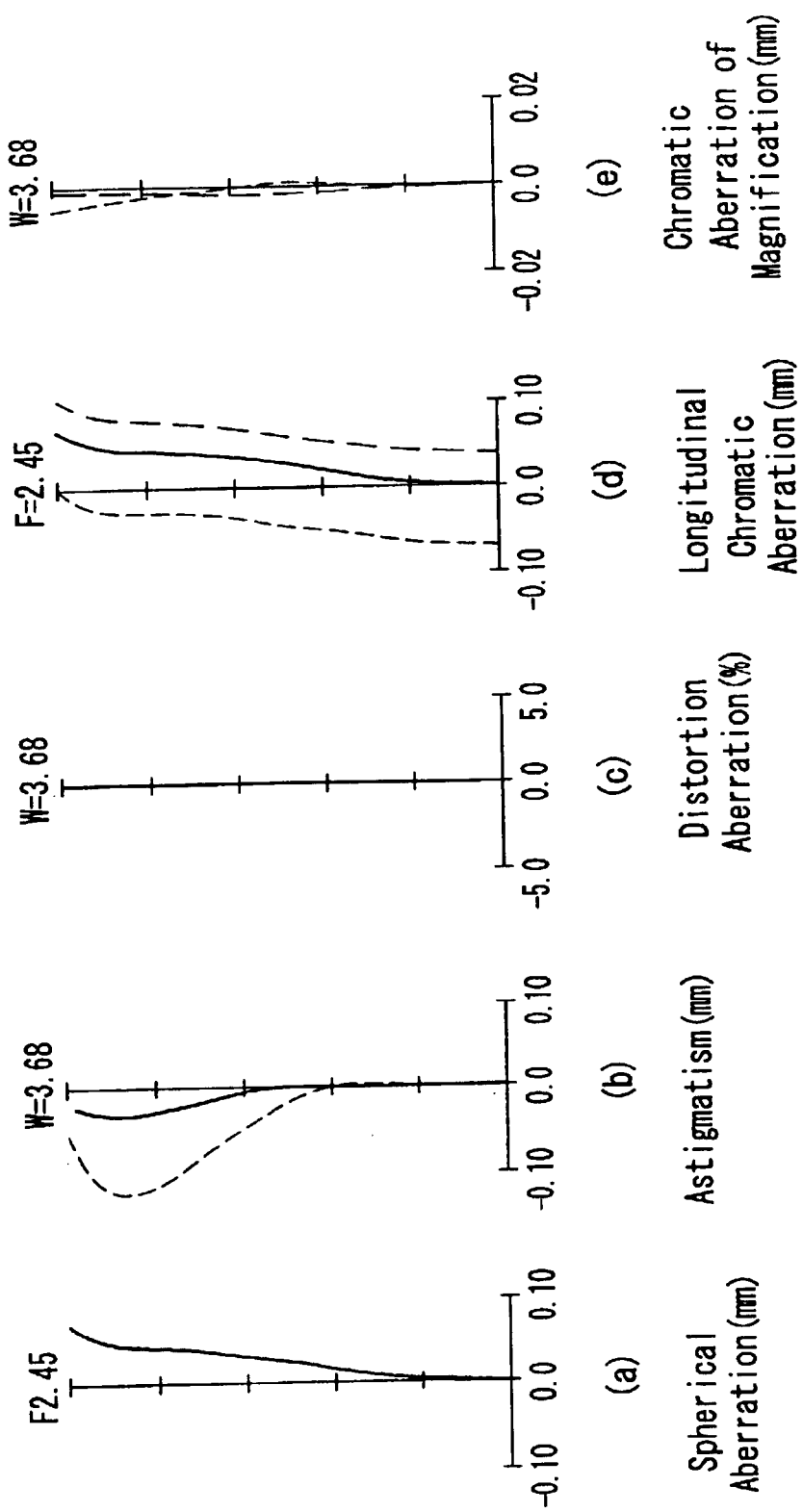
FIGS. 15A to 15E are views showing various aberrations at a normal position of the zoom lens according to Embodiment 4 of the present invention.
Figure 16:
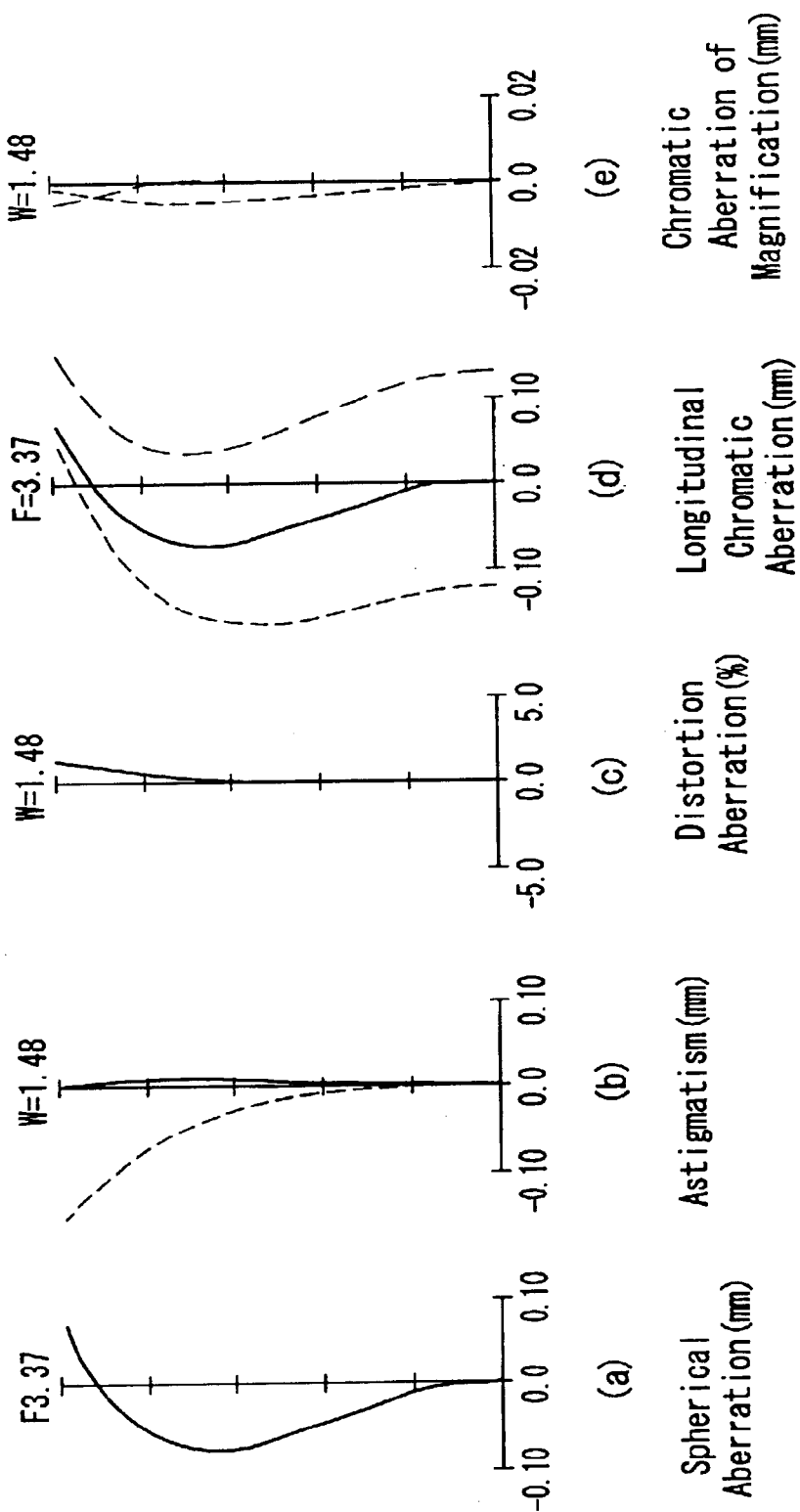
FIGS. 16A to 16E are views showing various aberrations at a tele position of the zoom lens according to Embodiment 4 of the present invention.

FIGS. 14A to 14E, 15A to 15E, and 16A to 16E show performances regarding various aberrations at the wide position, the normal position, and the tele position of the zoom lens shown in the present example, respectively. FIGS. 14A, 15A and 16A show a spherical aberration (mm); FIGS. 14B, 15B and 16B show astigmatism (mm); FIGS. 14C, 15C and 16C show a distortion aberration (%); FIGS. 14D, 15D and 16D show a longitudinal chromatic aberration (mm); and FIGS. 14E, 15E and 16E show a chromatic aberration of magnification (mm). In FIGS. 14B, 15B and 16B showing astigmatism, a solid line represents a sagittal field curvature, and a broken line represents a meridional field curvature. In FIGS. 14D, 15D and 16D showing the longitudinal chromatic aberration and FIGS. 14E, 15E and 16E showing the chromatic aberration of magnification, a solid line represents values with respect to the d-line, a short broken line represents values with respect to an F-line, and a long broken line represents values with respect to a C-line. As is apparent from the drawings regarding these aberrations, the zoom lens of the present example has an excellent aberration performance.

A movement amount of the image plane position according to a change in a refractive index of a plastic lens material caused by a temperature change is 0.9 μm/C.° when the object is positioned at infinity and the zooming position is at the wide position.

[Embodiment 5]

Figure 17:
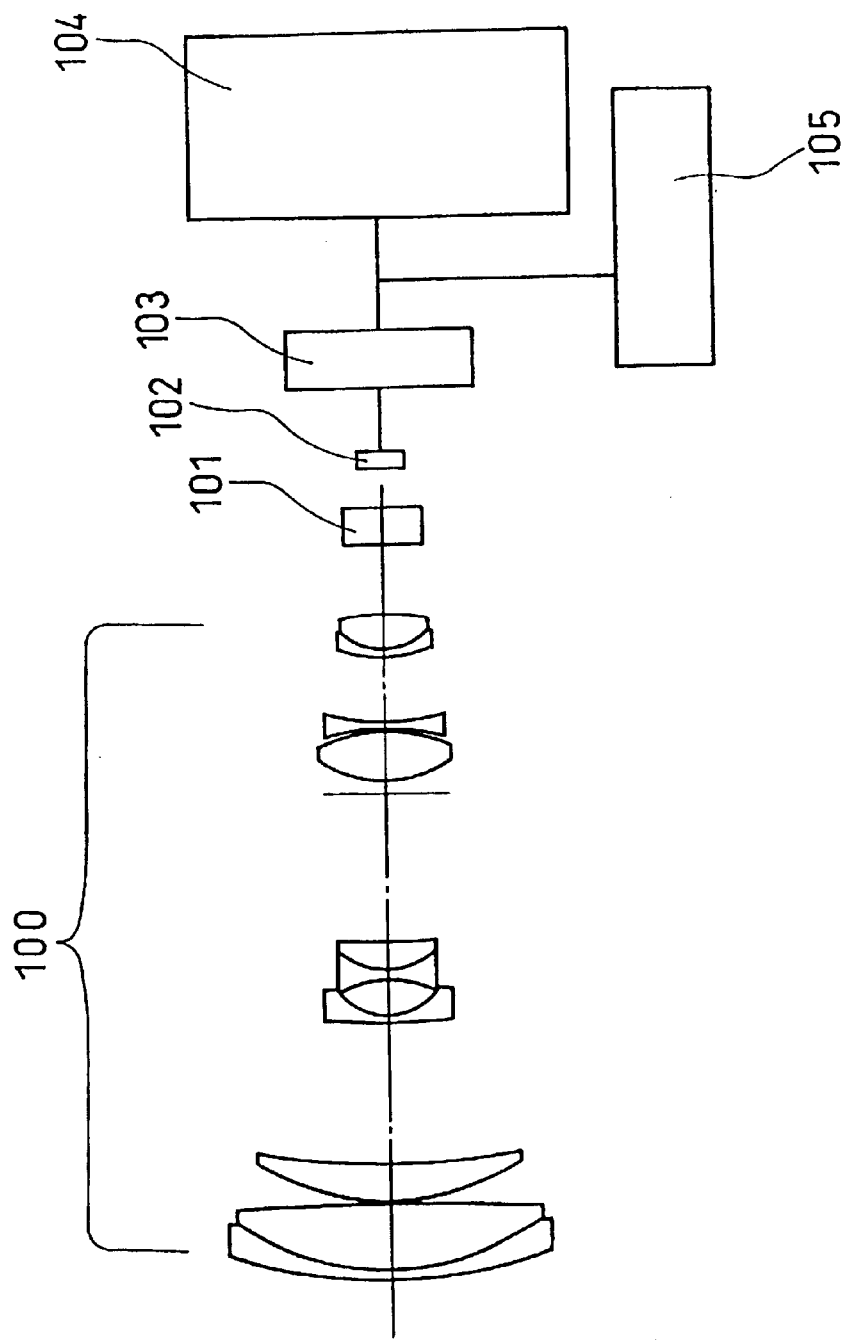
FIG. 17 is a view showing a configuration of a video camera according to Embodiment 5 of the present invention.

FIG. 17 is a view showing an arrangement of the configuration of a video camera according to the fifth embodiment of the present invention.

As shown in FIG. 17, the video camera according to this embodiment includes a zoom lens 100, a low-pass filter 101, an imaging device 102, a signal processing circuit 103, a viewer finder 104 and a recording system 105. Herein, as the zoom lens 100, the zoom lens according to Embodiment 1 is used.

In the case where a video camera is configured using a zoom lens of the present. invention, it is possible to provide a video camera that achieves high performance and low cost, as well as a high magnification at a zoom ratio of 23 times. It should be noted that even in the case where any one of the zoom lenses of Embodiments 2 to 4 are used, it is possible to provide a video camera that achieves high performance and low cost, as well as a high magnification at a zoom ratio of 23 times.

INDUSTRIAL APPLICABILITY

As mentioned above, according to the present invention, it is possible to provide a zoom lens that achieves high brightness at an F number of 1.6, a high magnification at a zoom ratio of 23 times, as well as high performance and low cost. Therefore, the zoom lens is applicable in a video camera that is requested to achieve a high zoom ratio, high functionality, and low cost.

What is claimed is:

1. A zoom lens, comprising:

a first lens group having positive refracting power and being fixed with respect to the image plane;

a second lens group having negative refracting power and varying power by moving along an optical axis;

a third lens group having positive refracting power and being fixed with respect to the image plane; and a fourth lens group having positive refracting power and moving along the optical axis so that the image plane varied by a movement of the second lens group and a movement of an object is kept at a predetermined position from a reference plane, the first, second, third, and fourth lens groups being arranged in this order from an object side to an image plane side, wherein the first lens group comprises a negative lens, a positive lens, and a positive meniscus lens arranged from the object side in this order, the positive meniscus lens having a convex surface on the object side, the second lens group comprises a negative lens, a double-concave lens, and a positive lens arranged from the object side in this order, and includes at least one aspherical surface, the double-concave lens and the positive lens being cemented with each other, the third lens group comprises a positive lens and a negative plastic lens arranged from the object side in this order, and includes at least one aspherical surface, and the fourth lens group comprises a negative plastic lens and a positive plastic lens that are arranged from the object side in this order and cemented with each other, and includes at least one aspherical surface, wherein an expression (1) below is satisfied:

$$5 < |(fp1+fp2+fp3)/fw| < 12 \quad (1)$$

where fp1 represents a focal length of the negative plastic lens of the third lens group, fp2 represents a focal length of the negative plastic lens of the fourth lens group, fp3 represents a focal length of the positive plastic lens of the fourth lens group, and fw represents a combined focal length of the entire system at a wide position.

2. The zoom lens according to claim 1, wherein an expression (2) below is satisfied:

$$7 < |(fp1+fp2+fp3)/fw| < 10.5 \quad (2).$$

3. The zoom lens according to claim 2, wherein expressions (3) to (6) below are satisfied:

$$9 < f1/fw < 11 \quad (3)$$

$$1 < |f2/fw| < 2 \quad (4)$$

$$4.5 < f3/fw < 6 \quad (5)$$

$$4.5 < f4/fw < 6.5 \quad (6)$$

where f1 represents a combined focal length of the first lens group, f2 represents a combined focal length of the second lens group, f3 represents a combined focal length of the third lens group, and f4 represents a combined focal length of the fourth lens group.

4. The zoom lens according to claim 3, wherein an expression (7) below is satisfied:

$$d12 \times fw < 1.2 \quad (7)$$

where d12 represents a distance between the positive lens and the negative plastic lens of the third lens group.

5. The zoom lens according to claim 1, wherein an expression (8) below is satisfied:

$$(\mathrm{sag}(r1)+\mathrm{sag}(r2)+d8)/d8 < 4.5 \quad (8)$$

where sag(r1) represents a sag amount between a center of an incident surface of the double-concave lens of the second lens group and a position where the incident surface of the double-concave lens is brought into contact with an outgoing surface of the negative lens disposed on the object side in the second lens group, sag (r2) represents a sag amount between a center and an outer-most peripheral portion of the outgoing surface of the double-concave lens, and d8 denotes a thickness of the double-concave lens.

6. The zoom lens according to claim 1, wherein a radius of curvature of a lens surface closest to the image plane of the first lens group and a radius of curvature of a lens surface closest to the object of the second lens group are equal to each other.

7. The zoom lens according to claim 1, wherein an expression (9) below is satisfied:

$$0.6 < BF/fw < 1.1 \tag{9}$$

where BF represents an air distance between an image-plane-side surface of the lens closest to the image plane and the image plane.

8. A zoom lens, comprising:
   a first lens group having positive refracting power and being fixed with respect to the image plane;
   a second lens group having negative refracting power and varying power by moving along an optical axis;
   a third lens group having positive refracting power and being fixed with respect to the image plane; and
   a fourth lens group having positive refracting power and moving along the optical axis so that the image plane varied by a movement of the second lens group and a movement of an object is kept at a predetermined position from a reference plane,
   the first, second, third, and fourth lens groups being arranged in this order from an object side to an image plane side,
   wherein
      the first lens group comprises a negative lens, a positive lens, and a positive meniscus lens arranged from the object side in this order, the positive meniscus lens having a convex surface on the object side,
      the second lens group comprises a negative lens, a double-concave lens, and a positive lens arranged from the object side in this order, and includes at least one aspherical surface, the double-concave lens and the positive lens being cemented with each other,
      the third lens group comprises a positive lens and a negative plastic lens arranged from the object side in this order, and includes at least one aspherical surface, and
      the fourth lens group comprises a positive plastic lens and a negative plastic lens that are arranged from the object side in this order and cemented with each other, and includes at least one aspherical surface,
   wherein an expression (10) below is satisfied:

$$5 < |(fp1+fp2+fp3)/fw1 < 12 \tag{10}$$

where
      fp1 represents a focal length of the negative plastic lens of the third lens group,
      fp2 represents a focal length of the positive plastic lens of the fourth lens group,
      fp3 represents a focal length of the negative plastic lens of the fourth lens group, and
      fw represents a combined focal length of the entire system at a wide position.

9. The zoom lens according to claim 8, wherein an expression (11) below is satisfied:

$$7 < |(fp1+fp2+fp3)/fw| < 10.5 \tag{11}$$

10. The zoom lens according to claim 9, wherein expressions (12) to (15) below are satisfied:

$$9 < f1/fw < 11 \tag{12}$$

$$1 < |f2/fw| < 2 \tag{13}$$

$$4.5 < f3/fw < 6 \tag{14}$$

$$4.5 < f4/fw < 6.5 \tag{15}$$

where
   f1 represents a combined focal length of the first lens group,
   f2 represents a combined focal length of the second lens group,
   f3 represents a combined focal length of the third lens group, and
   f4 represents a combined focal length of the fourth lens group.

11. The zoom lens according to claim 10, wherein an expression (16) below is satisfied:

$$d12 \times fw < 1.2 \tag{16}$$

where d12 represents a distance between the positive lens and the negative plastic lens of the third lens group.

12. The zoom lens according to claim 8, wherein an expression (17) below is satisfied:

$$(sag(r1)+sag(r2)+d8)/d8 < 4.5 \tag{17}$$

where
   sag (r1) represents a sag amount between a center of an incident surface of the double-concave lens of the second lens group and a position where the incident surface of the double-concave lens is brought into contact with an outgoing surface of the negative lens disposed on the object side in the second lens group,
   sag (r2) represents a sag amount between a center and an outer-most peripheral portion of the outgoing surface of the double-concave lens, and
   d8 denotes a thickness of the double-concave lens.

13. The zoom lens according to claim 8, wherein a radius of curvature of a lens surface closest to the image plane of the first lens group and a radius of curvature of a lens surface closest to the object of the second lens group are equal to each other.

14. The zoom lens according to claim 8, wherein an expression (18) below is satisfied:

$$0.6 < BF/fw < 1.1 \tag{18}$$

where BF represents an air distance between an image-plane-side surface of the lens closest to the image plane and the image plane.

15. A zoom lens, comprising:
   a first lens group having positive refracting power and being fixed with respect to the image plane;
   a second lens group having negative refracting power and varying power by moving along an optical axis;
   a third lens group having positive refracting power and being fixed with respect to the image plane; and
   a fourth lens group having positive refracting power and moving along the optical axis so that the image plane varied by a movement of the second lens group and a movement of an object is kept at a predetermined position from a reference plane,
   the first, second, third, and fourth lens groups being arranged in this order from an object side to an image plane side,
   wherein
      the first lens group comprises a negative lens, a positive lens, and a positive meniscus lens arranged from the object side in this order, the positive meniscus lens having a convex surface on the object side,
      the second lens group comprises a negative lens, a double-concave lens, and a positive lens arranged from the object side in this order, and includes at least one aspherical surface, the double-concave lens and the positive lens being cemented with each other, the third lens group comprises a positive lens and a negative plastic lens arranged from the object side in this order, and includes at least one aspherical surface, and the fourth lens group comprises a negative plastic lens and a positive plastic lens that are arranged from the object side in this order, and includes at least one aspherical surface, wherein an expression (19) below is satisfied:

$$5<|(fp1+fp2+fp3)/fw|<12 \qquad (19)$$

where fp1 represents a focal length of the negative plastic lens of the third lens group, fp2 represents a focal length of the negative plastic lens of the fourth lens group, fp3 represents a focal length of the positive plastic lens of the fourth lens group, and fw represents a combined focal length of the entire system at a wide position.

16. The zoom lens according to claim 15, wherein an expression (20) below is satisfied:

$$7<|(fp1+fp2+fp3)/fw|<10.5 \qquad (20).$$

17. The zoom lens according to claim 16, wherein expressions (21) to (24) below are satisfied:

$$9<f1/fw<11 \qquad (21)$$

$$1<|f2/fw|<2 \qquad (22)$$

$$4.5<f3/fw<6 \qquad (23)$$

$$4.5<f4/fw<6.5 \qquad (24)$$

where f1 represents a combined focal length of the first lens group, f2 represents a combined focal length of the second lens group, f3 represents a combined focal length of the third lens group, and f4 represents a combined focal length of the fourth lens group.

18. The zoom lens according to claim 17, wherein an expression (25) below is satisfied:

$$d12 \times fw<1.2 \qquad (25)$$

where d12 represents a distance between the positive lens and the negative plastic lens of the third lens group.

19. The zoom lens according to claim 15, wherein an expression (26) below is satisfied:

$$(\text{sag}(r1)+\text{sag}(r2)+d8)/d8<4.5 \qquad (26)$$

where sag(r1) represents a sag amount between a center of an incident surface of the double-concave lens of the second lens group and a position where the incident surface of the double-concave lens is brought into contact with an outgoing surface of the negative lens disposed on the object side in the second lens group, sag(r2) represents a sag amount between a center and an outer-most peripheral portion of the outgoing surface of the double-concave lens, and d8 denotes a thickness of the double-concave lens.

20. The zoom lens according to claim 15, wherein a radius of curvature of a lens surface closest to the image plane of the first lens group and a radius of curvature of a lens surface closest to the object of the second lens group are equal to each other.

21. The zoom lens according to claim 15, wherein an expression (27) below is satisfied:

$$0.6<BF/fw<1.1 \qquad (27)$$

where BF represents an air distance between an image-plane-side surface of the lens closest to the image plane and the image plane.

22. A zoom lens, comprising:

a first lens group having positive refracting power and being fixed with respect to the image plane;

a second lens group having negative refracting power and varying power by moving along an optical axis;

a third lens group having positive refracting power and being fixed with respect to the image plane; and a fourth lens group having positive refracting power and moving along the optical axis so that the image plane varied by a movement of the second lens group and a movement of an object is kept at a predetermined position from a reference plane, the first, second, third, and fourth lens groups being arranged in this order from an object side to an image plane side, wherein the first lens group comprises a negative lens, a positive lens, and a positive meniscus lens arranged from the object side in this order, the positive meniscus lens having a convex surface on the object side, the second lens group comprises a negative lens, a double-concave lens, and a positive lens arranged from the object side in this order, and includes at least one aspherical surface, the double-concave lens and the positive lens being cemented with each other, the third lens group comprises a positive lens and a negative plastic lens arranged from the object side in this order and cemented with each other, and includes at least one aspherical surface, and the fourth lens group comprises a negative plastic lens and a positive plastic lens that are arranged from the object side in this order and cemented with each other, and includes at least one aspherical surface, wherein an expression (1) below is satisfied:

$$5<|(fp1+fp2+fp3)/fw|<12 \qquad (1)$$

where fp1 represents a focal length of the negative plastic lens of the third lens group, fp2 represents a focal length of the negative plastic lens of the fourth lens group, fp3 represents a focal length of the positive plastic lens of the fourth lens group, and fw represents a combined focal length of the entire system at a wide position.

23. The zoom lens according to claim 22, wherein an expression (29) below is satisfied:

$$7<|(fp1+fp2+fp3)/fw|<10.5 \qquad (29).$$

24. The zoom lens according to claim 23, wherein expressions (30) to (33) below are satisfied:

$$9 < f1/fw < 11 \tag{30}$$

$$1 < |f2/fw| < 2 \tag{31}$$

$$4.5 < f3/fw < 6 \tag{32}$$

$$4.5 < f4/fw < 6.5 \tag{33}$$

where f1 represents a combined focal length of the first lens group, f2 represents a combined focal length of the second lens group, f3 represents a combined focal length of the third lens group, and f4 represents a combined focal length of the fourth lens group.

25. The zoom lens according to claim 22, wherein an expression (34) below is satisfied:

$$(sag(r1) + sag(r2) + d8)/d8 < 4,5 \tag{34}$$

where sag(r1) represents a sag amount between a center of an incident surface of the double-concave lens of the second lens group and a position where the incident surface of the double-concave lens is brought into contact with an outgoing surface of the negative lens disposed on the object side in the second lens group, sag(r2) represents a sag amount between a center and an outer-most peripheral portion of the outgoing surface of the double-concave lens, and d8 denotes a thickness of the double-concave lens.

26. The zoom lens according to claim 22, wherein a radius of curvature of a lens surface closest to the image plane of the first lens group and a radius of curvature of a lens surface closest to the object of the second lens group are equal to each other.

27. The zoom lens according to claim 22, wherein an expression (35) below is satisfied:

$$0.6 < BF/fw < 1.1 \tag{35}$$

where BF represents an air distance between an image-plane-side surface of the lens closest to the image plane and the image plane.

28. A video camera provided with the zoom lens of claim 1.

29. A video camera provided with the zoom lens of claim 8.

30. A video camera provided with the zoom lens of claim 15.

31. A video camera provided with the zoom lens of claim 22.

* * * * *